(12) United States Patent
Ide

(10) Patent No.: US 11,506,894 B2
(45) Date of Patent: *Nov. 22, 2022

(54) DISPLAY DEVICE

(71) Applicant: SEIKO EPSON CORPORATION, Tokyo (JP)

(72) Inventor: Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 16/669,632

(22) Filed: Oct. 31, 2019

(65) Prior Publication Data

US 2020/0142195 A1 May 7, 2020

(30) Foreign Application Priority Data

Nov. 1, 2018 (JP) ............................. JP2018-206386

(51) Int. Cl.
*G02B 27/01* (2006.01)
*G06F 1/16* (2006.01)

(52) U.S. Cl.
CPC ......... *G02B 27/0172* (2013.01); *G06F 1/163* (2013.01); *G02B 2027/011* (2013.01); *G02B 2027/0174* (2013.01); *G02B 2027/0178* (2013.01)

(58) Field of Classification Search
CPC .......... G02B 27/0172; G02B 2027/011; G02B 2027/0178; G02B 2027/0174; G02B 2027/0116; G02B 2027/0134; G02B 17/0836; G02B 17/086; G02B 27/0037; G02B 27/4211; G02B 27/4277;
(Continued)

(56) References Cited

U.S. PATENT DOCUMENTS 4,927,234 A * 5/1990 Banbury ............ G02B 27/0101
345/9
6,788,442 B1 * 9/2004 Potin .................. G02B 27/0172
345/8
(Continued)

FOREIGN PATENT DOCUMENTS

GB 2163869 A * 3/1986 ......... G02B 27/0101
JP 2002-139695 A 5/2002
(Continued)

*Primary Examiner* — Thomas K Pham
*Assistant Examiner* — Henry A Duong
(74) *Attorney, Agent, or Firm* — Oliff PLC

(57) ABSTRACT

A first optical unit having positive power a second optical unit including a first diffraction element and having positive power a third optical unit having positive power and a fourth optical unit including a second diffraction element and having a positive power. In the optical path, a first intermediate image of the image light is formed between the first optical unit and the third optical unit, a pupil is formed between the second optical unit and the fourth optical unit, a second intermediate image of the image light is formed between the third optical unit and the fourth optical unit, an exit pupil is formed on a side of the fourth optical unit opposite to the third optical unit, and a prism member configured to correct a ray shape of the image light is provided between the second optical unit and the fourth optical unit.

4 Claims, 19 Drawing Sheets

(58) Field of Classification Search
CPC ........ G02B 5/18; G02B 5/1847; G02B 5/188; G02B 2005/1804; G06F 1/163
USPC .......................................................... 359/567
See application file for complete search history.

(56) References Cited

U.S. PATENT DOCUMENTS

| | | | |
|---|---|---|---|
| 7,863,592 B1* | 1/2011 | Bignolles | G02B 23/125 |
| | | | 250/526 |
| 10,627,629 B2* | 4/2020 | Hung | G02B 13/06 |
| 10,866,424 B2* | 12/2020 | Fukase | G03H 1/0248 |
| 10,935,807 B2* | 3/2021 | Ide | G02B 27/0172 |
| 2002/0039232 A1 | 4/2002 | Takeyama | |
| 2013/0222384 A1* | 8/2013 | Futterer | G03H 1/2205 |
| | | | 345/426 |
| 2016/0103324 A1 | 4/2016 | Arakawa et al. | |
| 2017/0342623 A1 | 11/2017 | Nakamoto | |
| 2018/0151194 A1 | 5/2018 | Noguchi | |
| 2020/0393677 A1* | 12/2020 | Hua | G02B 6/0055 |

FOREIGN PATENT DOCUMENTS

| | | |
|---|---|---|
| JP | 2004-318140 A | 11/2004 |
| JP | 2015-111231 A | 6/2015 |
| JP | 2016-049266 A | 4/2016 |
| JP | 2016-71309 A | 5/2016 |
| JP | 2018-087949 A | 6/2018 |

* cited by examiner

DISPLAY DEVICE

The present application is based on, and claims priority from JP Application Serial Number 2018-206386, filed Nov. 1, 2018, the disclosure of which is hereby incorporated by reference herein in its entirety.

BACKGROUND

1. Technical Field

The present disclosure relates to a display device that displays an image using a diffraction element.

2. Related Art

As a display device including a diffraction element such as a holographic element, a display device has been proposed in which image light emitted from an image light generating device is deflected toward an eye of an observer by a diffraction element. Interference patterns are optimized in the diffraction element to obtain an optimum diffraction angle and optimum diffraction efficiency at a specific wavelength. However, the image light has a predetermined spectral width centered at a specific wavelength, and thus, light with a peripheral wavelength deviated from the specific wavelength may cause a decrease in resolution of an image. Thus, a display device has been proposed in which image light emitted from the image light generating device is directed by a first diffraction element of the reflective type toward a second diffraction element disposed in front of the first diffraction element and in which the second diffraction element deflects, toward the eye of the observer, the image light emitted from the first diffraction element. According to such a configuration, the first diffraction element can compensate for light with peripheral wavelengths to cancel chromatic aberration, and can suppress a decrease in resolution of an image due to the light with peripheral wavelengths deviated from the specific wavelength (see, for example, JP-A-2002-139695).

In the display device described above, since the image light is obliquely incident on the second diffraction element disposed in front of the eye of the observer, the incident shape of the image light incident on the second diffraction element is distorted. JP-A-2002-139695 does not disclose or suggest that the shape of the image light incident on the second diffraction element is corrected, and thus, fails to allow sufficient wavelength compensation, reducing the resolution of the image.

SUMMARY

To solve the above-described problem, a first aspect of the present invention provides a display device including a first optical unit having positive power, a second optical unit including a first diffraction element and having positive power, a third optical unit having positive power, and a fourth optical unit including a second diffraction element and having a positive power, the first to fourth optical units being provided along an optical path of image light emitted from an image light generating device, wherein in the optical path, a first intermediate image of the image light is formed between the first optical unit and the third optical unit, a pupil is formed between the second optical unit and the fourth optical unit, a second intermediate image of the image light is formed between the third optical unit and the fourth optical unit, an exit pupil is formed on a side of the fourth optical unit opposite to the third optical unit, and a prism member configured to correct a ray shape of the image light is provided between the second optical unit and the fourth optical unit.

A second aspect of the present invention provides a display device including a first optical unit having positive power and including a plurality of lenses, a second optical unit including a first diffraction element and having positive power, a third optical unit having positive power, and a fourth optical unit including a second diffraction element and having positive power, the first to fourth optical units being provided along an optical path of image light emitted from an image light generating device, wherein in the optical path, a first intermediate image of the image light is formed between the third optical unit, and a first lens positioned closest to the image light generating device among the plurality of lenses in the first optical unit, a pupil is formed between the second optical unit and the fourth optical unit, a second intermediate image of the image light is formed between the third optical unit and the fourth optical unit, an exit pupil is formed on a side of the fourth optical unit opposite to the third optical unit, and a prism member configured to correct a ray shape of the image light is provided between the second optical unit and the fourth optical unit.

In the display device according to the second aspect, the first intermediate image may be formed in the first optical unit.

In the display device according to the aspects described above, the prism member may be provided between the third optical unit and the fourth optical unit.

In the display device according to the aspects described above, the first optical unit, the second optical unit, the third optical unit, and the fourth optical unit may be disposed along one side of a predetermined curve, and when a direction away from the predetermined curve on the one side of the predetermined curve is defined as an outer side and a direction toward the predetermined curve on the one side of the predetermined curve is defined as an inner side, the prism member may be provided on the third optical unit side of the second intermediate image, and may be thicker on the outer side than on the inner side.

In the display device according to the aspects described above, the prism member may be provided integrally with the second diffraction element.

In the display device according to the above aspect, the first optical unit, the second optical unit, the third optical unit, and the fourth optical unit may be disposed along one side of a predetermined curve, and when a direction away from the predetermined curve on the one side of the predetermined curve is defined as an outer side and a direction toward the predetermined curve on the one side of the predetermined curve is defined as an inner side, the prism member may be thicker on the inner side than on the outer side.

In the display device according to the aspects described above, the prism member may include a surface having a curvature.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
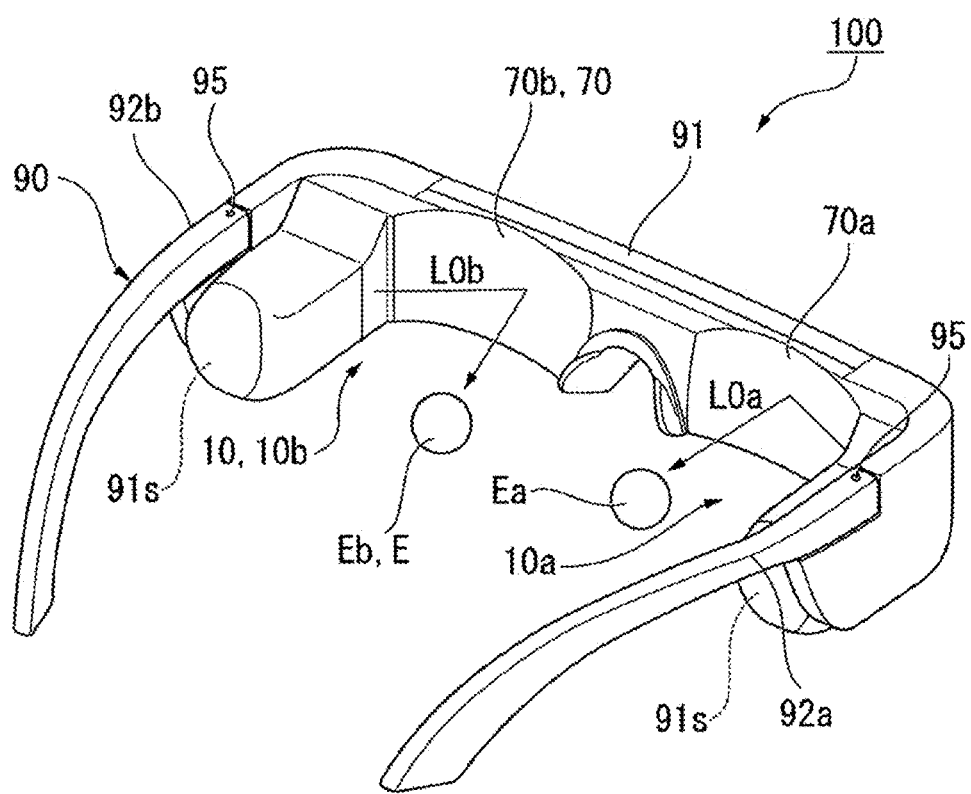
FIG. 1 is an external view illustrating an aspect of a visual appearance of a display device according to a first exemplary embodiment.
Figure 1:
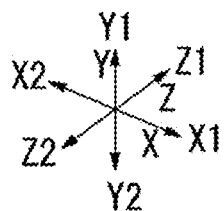
Figure 2:
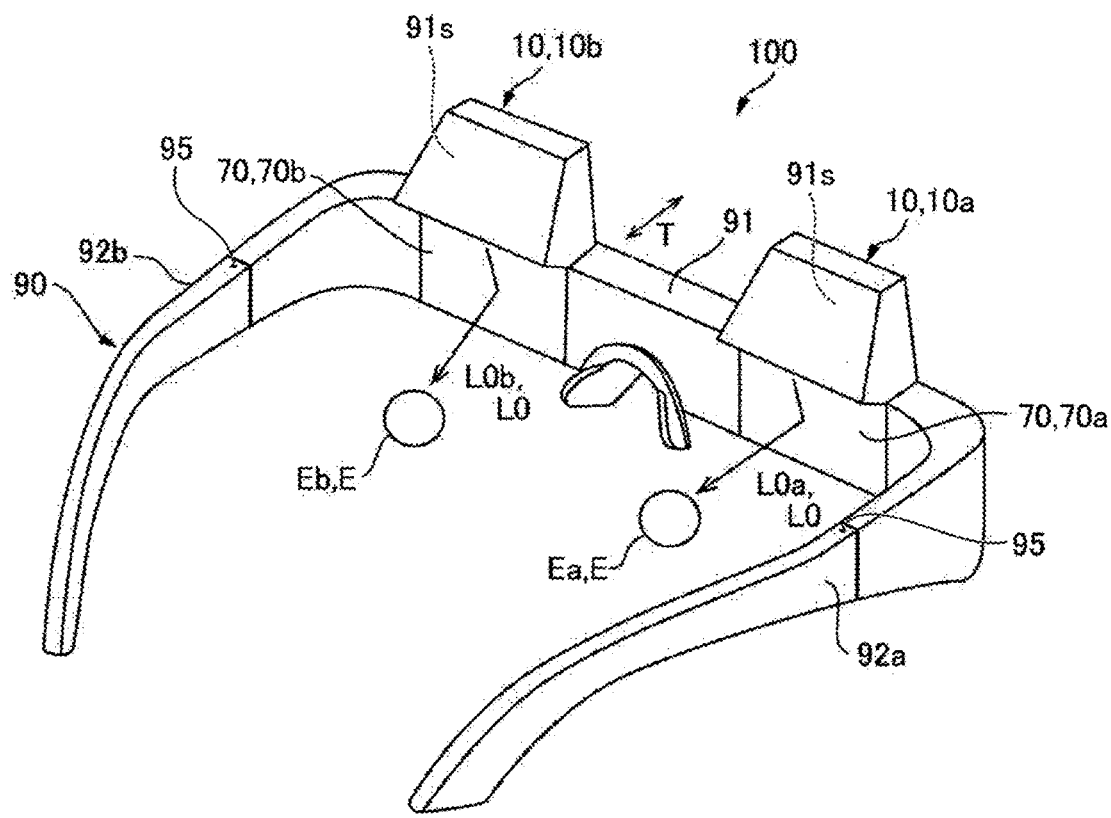
FIG. 2 is an external view illustrating an aspect of another visual appearance of the display device.
Figure 2:
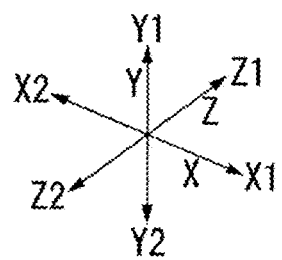
Figure 3:
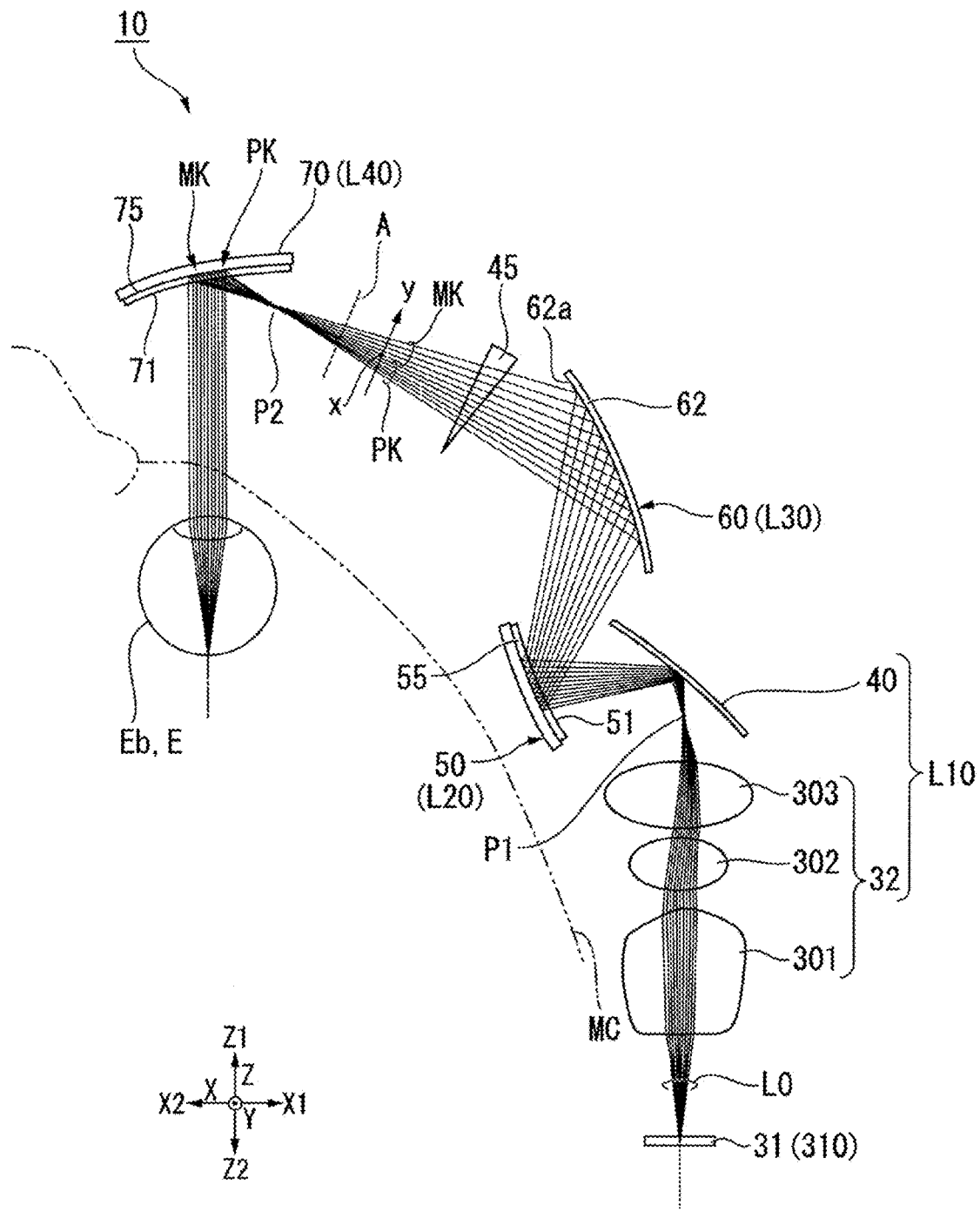
FIG. 3 is an explanatory diagram illustrating an aspect of an optical system of the display device.

FIG. 1 is an external view illustrating an aspect of a visual appearance of a display device 100 according to the present exemplary embodiment. FIG. 2 is an external view illustrating an aspect of a visual appearance of a display device 100. FIG. 3 is a schematic diagram illustrating an aspect of an optical system 10 of the display device 100 illustrated in FIG. 1. Note that, in the drawings described below, the following definitions are used as needed: a front and rear direction with respect to an observer wearing the display device is defined as a direction along a Z axis, one side in the front and rear direction corresponding to the front direction of the observer wearing the display device is defined as a front side Z1, and the other side in the front and rear direction corresponding to the rear direction of the observer wearing the display device is defined as a rear side Z2. A left and right direction with respect to the observer wearing the display device is defined as a direction along an X axis, one side in the left and right direction corresponding to the right direction of the observer wearing the display device is defined as a front side X1, and the other side in the left and right direction corresponding to the left direction of the observer wearing the display device is defined as a left side X2. An up and down direction with respect to the observer wearing the display device is defined as a direction along a Y axis, one side in the up and down direction corresponding to the up direction of the observer wearing the display device is defined as an up side Y1, and the other side in the left and right direction corresponding to the down direction of the observer wearing the display device is defined as a down side Y2.

The display device 100 illustrated in FIG. 1 is a head-mounted display device, and includes a right-eye optical system 10a that causes image light L0a to be incident on a right eye Ea and the left-eye optical system 10b that causes image light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted to the head of the observer by the housing 90.

In the display device 100, the housing 90 includes a frame 91, a temple 92a provided on the right side of the frame 91 and locked on the right ear of the observer, and a temple 92b provided on the left side of the frame 91 and locked on the left ear of the observer. The frame 91 includes storage spaces 91s on both sides of the frame 91, and the storage spaces 91s house components such as an image light projecting device that constitute the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

In the display device 100 illustrated in FIG. 1, image light L0 is caused to travel in the left and right direction along the X axis. However, as illustrated in FIG. 2, the image light L0 may be caused to travel from the up side Y1 to the down side Y2 and leave the display device 100 and enter the eye E of the observer, or the optical system 10 may be disposed to span the top of the head and the front of the eye E.

A basic configuration of the optical system 10 of the display device 100 will be described with reference to FIG. 3. FIG. 3 is a schematic diagram illustrating an aspect of the optical system 10 of the display device 100 illustrated in FIG. 1.

As illustrated in FIG. 3, in the optical system 10, a first optical unit L10, a second optical unit L20, a third optical unit L30, and a fourth optical unit L40 are arranged along an optical path direction of the image light L0 emitted from the image light generating device 31; the first optical unit L10 has positive power, the second optical unit L20 has positive power, the third optical unit L30 has positive power, and the fourth optical unit L40 has positive power.

In the optical system 10, with focus on a traveling direction of the image light L0, the image light generating device 31 emits the image light L0 toward a projection optical system 32, and the projection optical system 32 emits the incident image light L0 toward a mirror 40. The mirror 40 includes a reflection surface 40a and reflects the image light L0 toward the first diffraction element 50. The image light L0 reflected by the reflection surface 40a of the mirror 40 is incident on the first diffraction element 50. The image light L0 diffracted by the first diffraction element 50 is emitted toward a light guiding system 60. The light guiding system 60 emits the incident image light L0 into the second diffraction element 70, and the second diffraction element 70 emits the incident image light L0 toward the eye E of the observer.

In the present exemplary embodiment, the image light generating device 31 generates image light L0.

An aspect may be adopted where the image light generating device 31 includes a display panel 310 such as an organic electroluminescent display element. The aspect can provide a small-sized display device 100 capable of displaying a high-quality image. An aspect may be adopted where the image light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light generating device 31 modulates laser light using a micromirror device.

The projection optical system 32 is an optical system configured to project image light L0 generated by the image light generating device 31, and includes a first lens 301, a second lens 302, and a third lens 303. The first lens 301, the second lens 302, and the third lens 303 includes a free-form surface lens or a rotationally symmetric lens. The projection optical system 32 may be an eccentric optical system. In the example in FIG. 3, the projection optical system 32 includes three lenses, but the number of lenses is not limited to three, and the projection optical system 32 may include five or more lenses. The lenses may be stuck together to form the projection optical system 32.

The light guiding system 60 includes a mirror 62 with a reflection surface 62a that is more recessed at the center than at peripheral portions. The light guiding system 60 has positive power. The mirror 62 includes a reflection surface 62a inclined obliquely in the front and rear direction. The reflection surface 62a includes a spherical surface, an aspherical surface, a free-form surface, or the like. In the present exemplary embodiment, the mirror 62 is a total reflection mirror with the reflection surface 62a including a free-form surface. However, the mirror 62 may be a half mirror, and in this case, the range in which external light is visible can be widened.

Now, a configuration of the first diffraction element 50 and the second diffraction element 70 will be described.

In the present exemplary embodiment, the first diffraction element 50 and the second diffraction element 70 have the same basic configuration. Hereinafter, the configuration of the second diffraction element 70 will be described as an example.

Figure 4A:
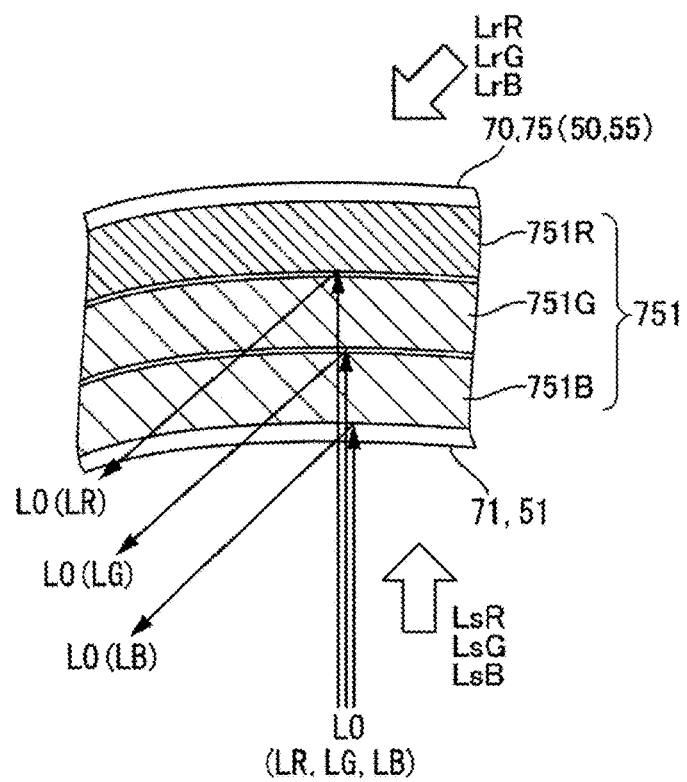
FIG. 4A is an explanatory diagram of interference patterns of a diffraction element.

FIG. 4A is an explanatory diagram of interference patterns 751 of the second diffraction element 70 illustrated in FIG. 3. In FIG. 4A, the second diffraction element 70 includes a reflective volume holographic element 75 that is a partially reflective diffraction optical element. Thus, the second diffraction element 70 forms a partial transmissive reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. The incident surface 71 of the second diffraction element 70 on which the image light L0 is incident has a concave surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The second diffraction element 70 includes the interference patterns 751 with a pitch corresponding to a specific wavelength. The interference patterns 751 are recorded as a difference in refractive index and the like in a hologram photosensitive layer. The interference patterns 751 are inclined in one direction with respect to the incident surface 71 of the second diffraction element 70 so as to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference patterns 751 having the configuration can be formed by performing interference exposure on the holographic photosensitive layer by using reference light Lr and object light Ls.

In the present exemplary embodiment, the image light L0 is used for color display, and thus includes red light LR, green light LG, and blue light LB, which will be described later. Thus, the second diffraction element 70 includes interference patterns 751R, 751G, and 751B formed at a pitch corresponding to a specific wavelength. For example, the interference patterns 751R are formed, for example, at a pitch corresponding to the red light LR with a wavelength of 615 nm included in a wavelength range from 580 nm to 700 nm. The interference patterns 751G are formed, for example, at a pitch corresponding to the green light LG with a wavelength of 535 nm included in a wavelength range from 500 nm to 580 nm. The interference patterns 751B are formed, for example, at a pitch corresponding to the blue light LB with a wavelength of 460 nm, for example, in a wavelength range from 400 nm to 500 nm. The configuration can be formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Figure 4B:
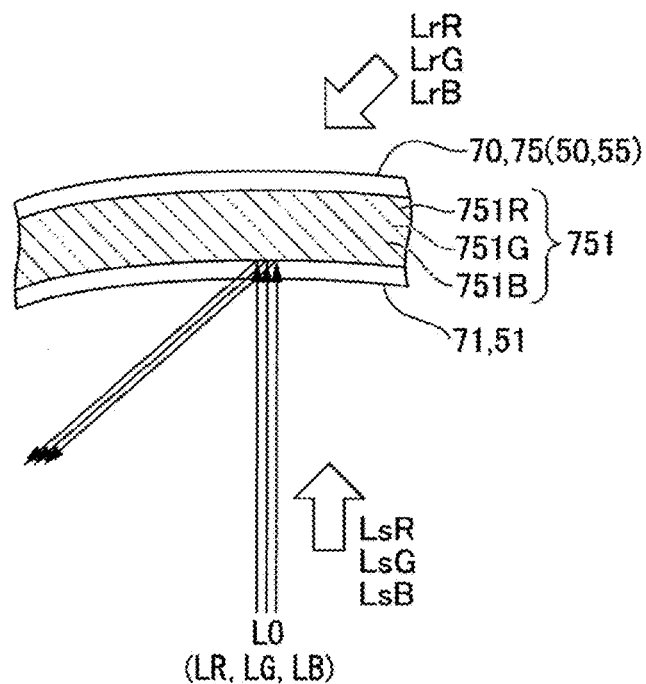
FIG. 4B is an explanatory diagram of another form of interference patterns of the diffraction element.

Note that interference patterns 751 including the interference patterns 751R, 751G, and 751B superimposed on one another in one layer as illustrated in FIG. 4B may be formed by dispersing a photosensitive material having sensitivity corresponding to the respective wavelengths in a holographic photosensitive layer and then performing interference exposure on the holographic photosensitive layer by using reference light LrR, LrG, and LrB and object light LsR, LsG, and LsB having the respective wavelengths. Light with a spherical wave may be used as the reference light LrR, LrG, and LrB and the object light LsR, LsG, and LsB.

The first diffraction element 50 with the same basic configuration as the second diffraction element 70 is provided with a reflective volume holographic element 55. The incident surface 51 of the first diffraction element 50 on which the image light L0 is incident has a concave surface being recessed. In other words, the incident surface 51 has a shape having a central portion recessed and curved with respect to a peripheral portion in the incident direction of the image light L0. Thus, the image light L0 can be efficiently deflected toward the light guiding system 60.

Figure 5:
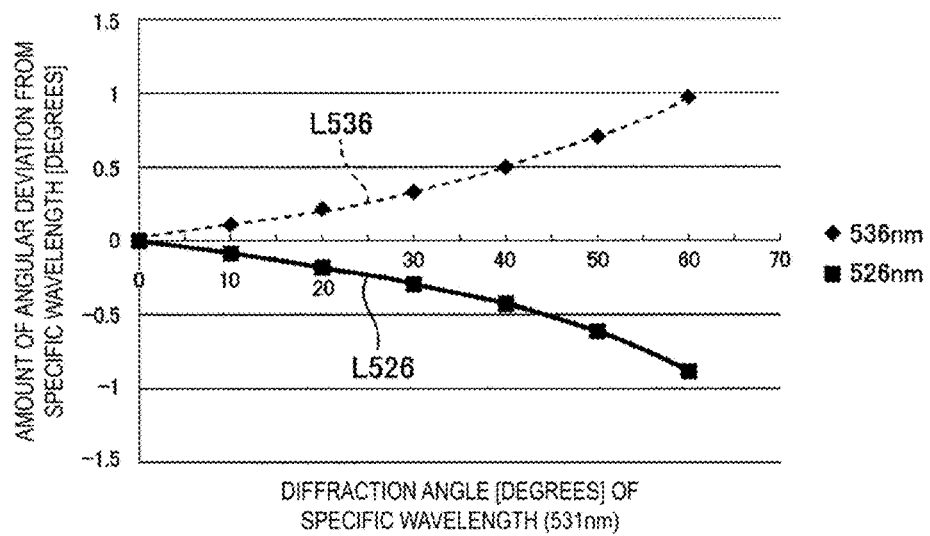
FIG. 5 is an explanatory diagram of diffraction characteristics of a volume hologram constituting a first diffraction element and a second diffraction element.

FIG. 5 is a diagram illustrating diffraction characteristics of a volume hologram constituting the first diffraction element 50 and the second diffraction element 70 illustrated in FIG. 3. FIG. 5 illustrates the difference in diffraction angle between a specific wavelength and peripheral wavelengths when a light ray is incident on a single point on the volume hologram. In FIG. 5, when the specific wavelength is 531 nm, a deviation in the diffraction angle of light with a peripheral wavelength of 526 nm is indicated by a solid line L526, and a deviation in the diffraction angle of light with a peripheral wavelength of 536 nm is indicated by a dashed line L536. As illustrated in FIG. 5, even when light rays are incident on the same interference pattern recorded in the hologram, a light ray with a longer wavelength is more significantly diffracted, and a light ray with a shorter wavelength is less likely to diffracted. Thus, when two diffraction elements, namely, the first diffraction element 50 and the second diffraction element 70 are used as in the present exemplary embodiment, proper wavelength compensation fails to be achieved unless considerations are given for the ray angle of incident light with a wavelength larger or smaller than the specific wavelength. In other words, chromatic aberration occurring in the second diffraction element 70 fails to be canceled. Because the angle of diffraction varies depending on the number of interference patterns, interference patterns need to be considered.

In the optical system 10 illustrated in FIG. 3, wavelength compensation, i.e., chromatic aberration, can be cancelled because, as described in JP-A-2017-167181, the direction of incidence on the second diffraction element 70 and the like have been made appropriate based on the number of times that an intermediate image is formed between the first diffraction element 50 and the second diffraction element 70 and whether the sum of the numbers of reflections by the mirror 62 is odd or even.

Figure 6:
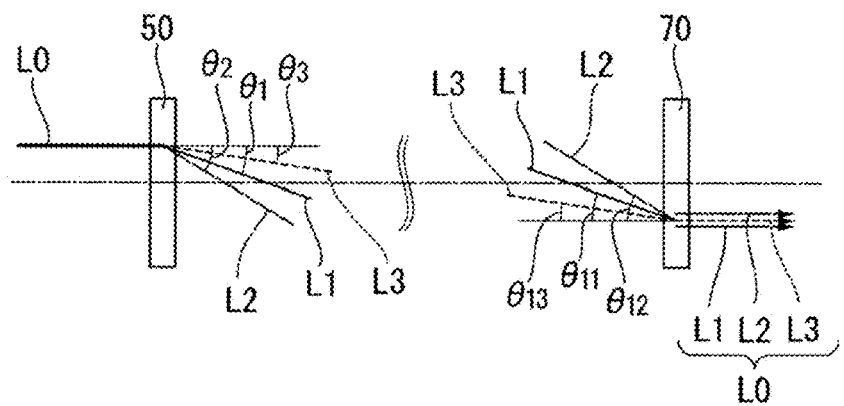
FIG. 6 is an explanatory diagram of the principle of cancellation of chromatic aberration occurring at the second diffraction element.

FIG. 6 is a diagram illustrating the principle of cancellation of chromatic aberration occurring in the second diffraction element 70. Note that FIG. 6 also illustrates, in addition to light L1 (solid line) with the specific wavelength of the image light L0, light L2 (dot-and-dash line) on a long wavelength side and light L3 (dotted line) on a short wavelength side with respect to the specific wavelength.

Specifically, the image light L0 incident on the first diffraction element 50 is deflected by being diffracted the first diffraction element 50 as illustrated in FIG. 6. At this time, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than a diffraction angle $\theta_1$ of the light L1 with the specific wavelength. Therefore, the image light L0 emitted from the first diffraction element 50 is deflected and dispersed at each wavelength.

The image light L0 emitted from the first diffraction element 50 is incident on the second diffraction element 70 via the light guiding system 60 and is then diffracted and deflected by the second diffraction element 70. At this time, in an optical path from the first diffraction element 50 to the second diffraction element 70, an intermediate image is formed once, and reflection by the member 62 occurs once. Therefore, when the incident angle is defined as an angle between the image light L0 and a normal line of an incident surface of the second diffraction element 70, the light L2 on the long wavelength side with respect to the specific wavelength has an incident angle $\theta_{12}$ larger than the incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. As described above, the light L2 on the long wavelength side with respect to the specific wavelength has a diffraction angle $\theta_2$ larger than a diffraction angle $\theta_1$ of the light L1 with the specific wavelength. The light L3 on the short wavelength side with respect to the specific wavelength has a diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a larger incident angle than the light L1 with the specific wavelength. However, the light L2 on the long wavelength side with respect to the specific wavelength has a larger diffraction angle than the light L1 with the specific wavelength, and as a result, the light L2 on the long wavelength side with respect to the specific wavelength and the light L1 with the specific wavelength are substantially parallel when being emitted from the second diffraction element 70. In contrast, the light L3 on the short wavelength side with respect to the specific wavelength is incident on the first diffraction element 50 at a smaller incident angle than the light L1 with the specific wavelength. However, the light L3 on the short wavelength side with respect to the specific wavelength has a smaller diffraction angle than the light L1 with the specific wavelength, and as a result, the light L3 on the short wavelength side with respect to the specific wavelength and the light L1 with the specific wavelength are substantially parallel when being emitted from the second diffraction element 70. Accordingly, as illustrated in FIG. 6, the image light L0 emitted from the second diffraction element 70 is incident on the eye E of the observer as substantially parallel light, thus suppressing a shift in an imaging position on a retina E0 at each wavelength. Accordingly, the chromatic aberration occurring in the second diffraction element 70 can be canceled.

Now, a conjugate relationship between the first diffraction element 50 and the second diffraction element 70 will be described.

Figure 7A:
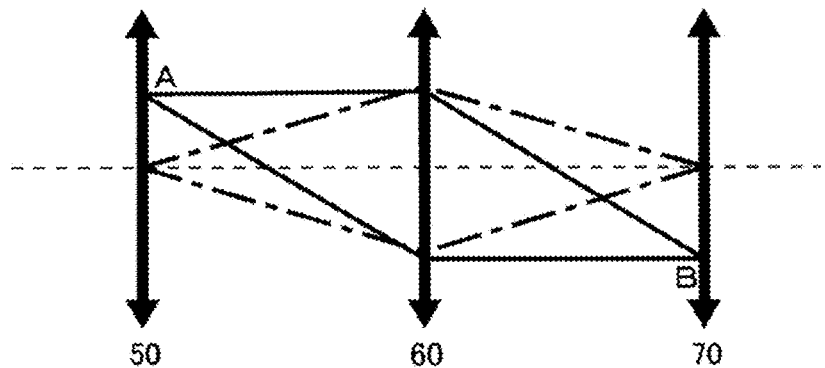
FIG. 7A is an explanatory diagram illustrating a case where the first and second diffraction elements are in a conjugate relationship.
Figure 7B:
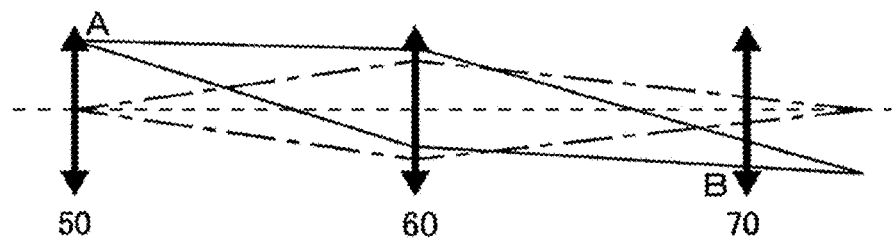
FIG. 7B is an explanatory diagram illustrating a case where the first and second diffraction elements are not in the conjugate relationship.
Figure 7C:
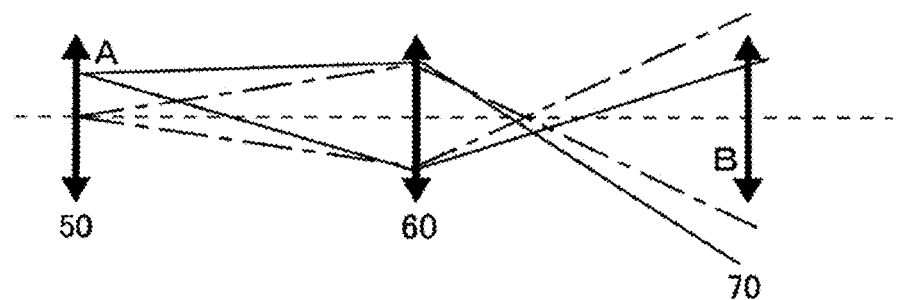
FIG. 7C is an explanatory diagram illustrating the case where the first and second diffraction elements are not in the conjugate relationship.
Figure 8A:
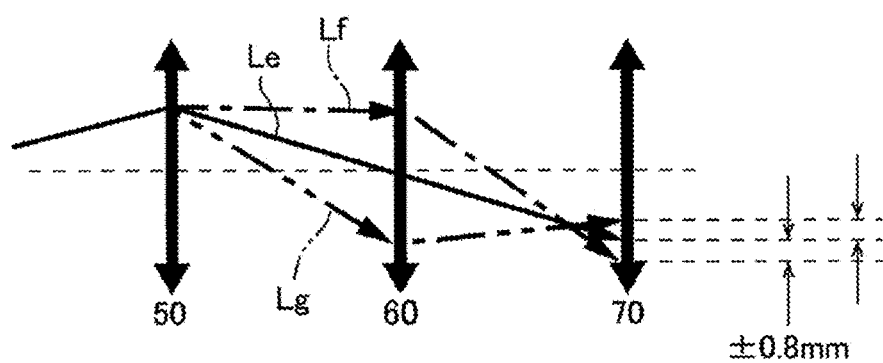
FIG. 8A is an explanatory diagram illustrating a tolerance for deviations from the conjugate relationship between the first and second diffraction elements.
Figure 8B:
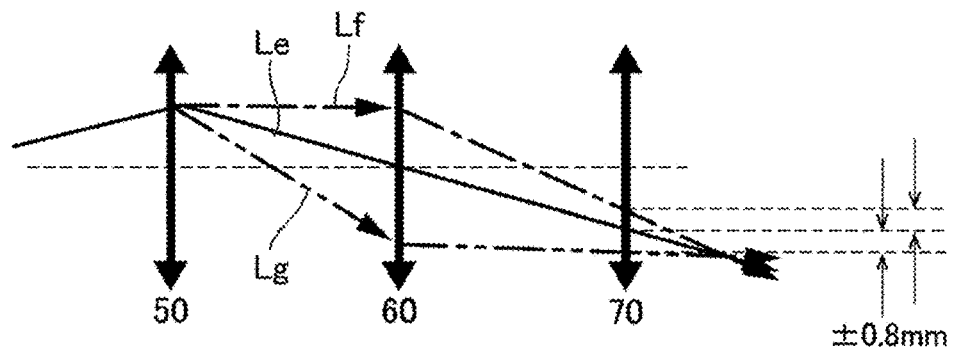
FIG. 8B is an explanatory diagram of another form illustrating a tolerance for deviations from the conjugate relationship between the first and second diffraction elements.

FIG. 7A is an explanatory diagram of a case where the first diffraction element 50 and the second diffraction element 70 are in the conjugate relationship. FIGS. 7B and 7C are explanatory diagrams of a case where the first diffraction element 50 and the second diffraction element 70 are not in the conjugate relationship. FIGS. 8A and 8B are explanatory diagrams illustrating a tolerance for deviations from the conjugate relationship between the first diffraction element 50 and the second diffraction element 70 illustrated in FIGS. 7B and 7C. In FIG. 8A and FIG. 8B, light with a specific wavelength is indicated by a solid line Le, light with a specific wavelength −10 nm is indicated by a dot-dash line Lf, and light with a specific wavelength +10 nm is indicated by a two-dot chain line Lg. Note that, in FIGS. 7A to 7C, FIG. 8A, and FIG. 8B, for facilitation of understanding of light traveling, the first diffraction element 50, the second diffraction element 70, and the light guiding system 60 are illustrated as a transmissive-type and indicated by arrows.

As illustrated in FIG. 7A, when the first diffraction element 50 and the second diffraction element 70 are in the conjugate relationship, divergent light rays emitted from a point A (first position) of the first diffraction element 50 are collected by the light guiding system 60 (lens) having positive power, and are incident at a point B (second position corresponding to the first position) of the second diffraction element 70. Therefore, chromatic aberration caused by diffraction occurring at the point B can be compensated for at the point A.

In contrast, as illustrated in FIG. 7B and FIG. 7C, when the first diffraction element 50 and the second diffraction element 70 are not in the conjugate relationship, divergent light rays emitted from the point A of the first diffraction element 50 are collected by the light guiding system 60, centrally located and having positive power, but intersect with each other and are incident at a position farther from the point B on the second diffraction element 70 or at a point between the first diffraction element 50 and the point B. Thus, the point A and the point B are not in a one-to-one relationship. Here, the effect of compensation is high when the interference patterns in a region are uniform, and thus, the compensation effect is low when the first diffraction element 50 and the second diffraction element 70 are not in the conjugate relationship. On the other hand, it is difficult to compensate for the entire projection region of the second diffraction element 70 using the first diffraction element 50. Therefore, in the aspects illustrated in FIG. 7B and FIG. 7C, sufficient wavelength compensation fails to be achieved, leading to a reduced resolution.

Note that light with a wavelength of ±10 nm from the specific wavelength has an error of ±0.4 mm with respect to the point B where the light with the specific wavelength arrives, but the reduction in resolution is not noticeable. Results of examination of such a permissible range indicate that, as illustrated in FIG. 8A, a decrease in resolution is unnoticeable when light rays with the specific wavelength intersect with each other at a point between the first diffraction element 50 and the point B on the second diffraction element 70, corresponding to the ideal point at which the light with the specific wavelength arrives, and are incident in a range of ±0.8 mm from the point B. As illustrated in FIG. 8B, a decrease in resolution is unnoticeable when light of a specific wavelength is incident in a range of ±0.8 mm that intersects with the B point on the ideal second diffraction element 70 where light of a specific wavelength reaches. Therefore, even when the first diffraction element 50 and the second diffraction element 70 are not in the perfect conjugate relationship, a decrease in resolution is permissible when the first diffraction element 50 and the second diffraction element 70 are in a substantially conjugate relationship and the light rays arrive within the range of ±0.8 mm from the ideal point B. In other words, in the present exemplary embodiment, the conjugate relationship between the first diffraction element 50 and the second diffraction element 70 means that the incident position of light with the specific wavelength has an error range of ±0.8 mm from the ideal incident point.

Figure 9:
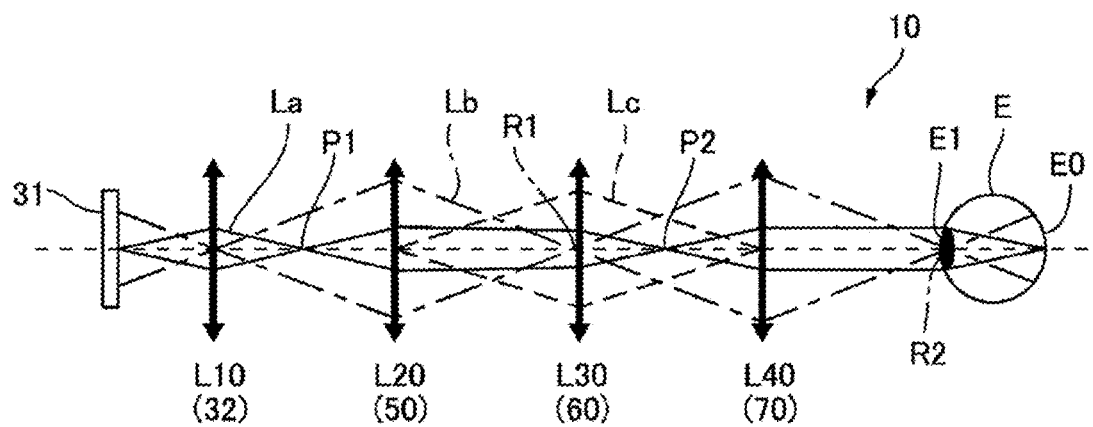
FIG. 9 is a diagram illustrating light rays in an optical system.

FIG. 9 is a diagram of light rays in the optical system 10 of the present exemplary embodiment. In FIG. 9 and the figures referred to below, each of the optical units disposed along the optical axis is indicated by a thick arrow. A solid line La indicates a light ray emitted from one pixel of the image light generating device 31, a dot-dash line Lb indicates a principal ray emitted from an end portion of the image light generating device 31, and a long dashed line Lc indicates a position that has a conjugate relationship with the first diffraction element 50. Here, "intermediate image" refers to a position where light rays (solid lines La) emitted from one pixel converge, and "pupil" refers to a position where the principal rays (dot-dash lines Lb) of angles of view converge. FIG. 9 also illustrates traveling of light emitted from the image light generating device 31. Note that, in FIG. 9, all optical units are illustrated as the transmissive-type for simplification of the figure.

As illustrated in FIG. 9, the optical system 10 of the present exemplary embodiment includes a first optical unit L10, a second optical unit L20, a third optical unit L30, and a fourth optical unit L40 provided along an optical path of image light emitted from the image light generating device 31; the first optical unit L10 has positive power, the second optical unit L20 includes the first diffraction element 50 and has positive power, the third optical unit L30 has positive power, and the fourth optical unit L40 includes the second diffraction element 70 and has positive power.

The first optical unit L10 has a focal length L/2, and the second optical unit L20, the third optical unit L30, and the fourth optical unit L40 each have a focal length L. Therefore, an optical distance from the second optical unit L20 to the third optical unit L30 is equal to an optical distance from the third optical unit L30 to the fourth optical unit L40.

In such an optical system 10, a first intermediate image P1 of image light is formed between the first optical unit L10 and the third optical unit L30, a pupil R1 is formed between the second optical unit L20 and the fourth optical unit L40, a second intermediate image P2 of image light is formed between the third optical unit L30 and the fourth optical unit L40, and the fourth optical unit L40 collimates the image light to form an exit pupil R2. At this time, the third optical unit L30 freely controllably converts the image light emitted from the second optical unit L20 into divergent light, convergent light, or parallel light, which is then caused to enter the fourth optical unit L40. The second optical unit L20 causes image light emitted from the first optical unit L10 to enter the third optical unit L30 as convergent light. In the optical system 10 of the present exemplary embodiment, the pupil R1 is formed between the second optical unit L2 and the fourth optical unit L40 and in the vicinity of the third optical unit L30. The vicinity of the third optical unit L30 refers to a position between the second optical unit L20 and the third optical unit L30 that is closer to the third optical unit L30 than to the second optical unit L20, or between the third optical unit L30 and the fourth optical unit L40, which is closer to the third optical unit L30 than to the fourth optical unit L40.

For the image light from one point of the image light generating device 31, the third optical unit L30 causes light with a peripheral wavelength deviated from the specific wavelength due to deflection by the first diffraction element 50 to enter a predetermined range of the second diffraction element 70. In other words, the first diffraction element 50 and the second diffraction element 70 are in the conjugate relationship or the substantially conjugate relationship. Here, the absolute value of magnification of projection on the second diffraction element 70 by the third optical unit L30 of the first diffraction element 50 ranges from 0.5 times to 10 times, and the absolute value of such magnification may range from 1 time to 5 times.

Thus, according to the optical system 10 of the present exemplary embodiment, the first intermediate image P1 of the image light is formed between the projection optical system 32 and the light guiding system 60, the pupil R1 is formed in the vicinity of the light guiding system 60, the second intermediate image P2 of the image light is formed between the light guiding system 60 and the second diffraction element 70, and the second diffraction element 70 collimates the image light to form the exit pupil R2.

In the optical system 10 of the present exemplary embodiment, the first intermediate image P1 is formed between the first optical unit L10 (projection optical system 32) and the second optical unit L20 (first diffraction element 50).

Here, to satisfy the conjugate relationship or the substantially conjugate relationship between the first diffraction element 50 and the second diffraction element 70 as described above, the state of incidence of the image light on the first diffraction element 50 needs to be the same as the state of incidence of the image light on the second diffraction element 70. In other words, when the ray shape of the image light incident on the eye E of the observer is, for example, circular, imaging light rays of the image light incident on the first diffraction element 50 and the second diffraction element 70 also need to be circular.

As illustrated in FIG. 3, in the optical system 10 of the present exemplary embodiment, the second diffraction element 70 employs the structure in which the second diffraction element 70 is disposed in front of the eye E of the observer, and thus, the image light L0 is obliquely incident on the second diffraction element 70. Hereinafter, the state in which the image light L0 is obliquely incident is simply referred to as "oblique incidence".

The image light illustrated in FIG. 3 is a meridional ray passing through a meridional plane that is a plane including a principal ray and the optical axis.

Hereinafter, in the description of FIG. 3, an xy coordinate system is used in which a y axis represents a direction that is orthogonal to the principal rays of the image light and that extends away from the profile of the face of the observer and in which an x axis represents a direction orthogonal to the y direction and the sheet of FIG. 3.

"Negative-side light rays MK" refer to light rays included in the plurality of meridional rays representing the image light in FIG. 3 and emitted from the image forming device 31 to the right side X1 and passing through the formation position of the second intermediate image P2 and entering the second diffraction element 70.

"Positive-side light rays PK" refer to light rays included in the plurality of meridional rays representing the image light in FIG. 3 and emitted from the image forming device 31 to the left side X2 and passing through the formation position of the second intermediate image P2 and entering the second diffraction element 70.

As illustrated in FIG. 3, among the negative-side light rays MK, light rays incident on the second intermediate image P2 from a longer distance on the +y side have a longer optical path from the second intermediate image P2 to the second diffraction element 70. In other words, the negative-side light rays MK have a relatively large angle of incidence on the second diffraction element 70.

On the other hand, as illustrated in FIG. 3, for the positive-side light rays PK, light rays incident on the second intermediate image P2 from a longer distance on the −y side have a shorter optical path from the second intermediate image P2 to the second diffraction element 70. In other words, the positive-side light rays PK have a relatively small angle of incidence on the second diffraction element 70.

When the image light is obliquely incident on the second diffraction element 70 in this way, the ray shape of the image light on the second diffraction element 70 is distorted and prevented from differing from a circle. Then, the ray shape of the image light incident on the eye E of the observer differs from the shape of the imaging light ray of the image light incident on the first diffraction element 50 and the second diffraction element 70. Thus, the first diffraction element 50 and the second diffraction element 70 fail to satisfy the conjugate relationship or the substantially conjugate relationship and to achieve proper wavelength compensation.

Thus, when the image light is obliquely incident on the second diffraction element 70, the flux shape of the image light needs to be corrected as desired in advance in consideration of distortion caused by oblique incidence so that the ray shape of the image light on the second diffraction element 70 becomes circular as described above.

Here, correcting the flux shape of the image light in advance in consideration of distortion caused by oblique incidence means that the ray shape of the image light is corrected such that the obliquely incident image light has a desired shape, for example, a circular shape, on the second diffraction element 70.

Figure 10:
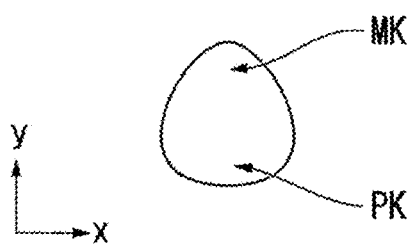
FIG. 10 is a diagram illustrating an example of a flux shape of image light used in consideration of oblique incidence.

FIG. 10 is a diagram illustrating an example of the flux shape of the image light used in consideration of oblique incidence. FIG. 10 corresponds to a cross section of the image light along the xy plane at the position indicated by reference numeral A in FIG. 3, and illustrates the flux cross-sectional shape of the image light in the vicinity of the second intermediate image P2.

As illustrated in FIG. 10, the +y side of the ray shape of the image light is formed of the negative-side light rays MK, and the −y side of the ray shape of the image light is formed of the positive-side light rays PK.

Here, the negative-side light rays MK have a relatively large angle of incidence on the second diffraction element 70, that is, involve a long distance from the intermediate image position to the object, and are likely to expand an illumination region formed on the second diffraction element 70. On the other hand, the positive-side light rays PK have a relatively small angle of incidence on the second diffraction element 70, that is, involve a short distance from the intermediate image position to the object, and are less likely to expand the illumination region formed on the second diffraction element 70 than the negative-side light rays MK.

For this reason, the ray shape of the image light used in consideration of oblique incidence is such that the thickness of light rays is reduced with increasing distance toward the +y side including the negative-side light rays MK, which are likely to significantly expand the illumination region on the second diffraction element 70, whereas the thickness of light rays is increased consistently with distance toward the −y side including the positive-side light rays PK, which are unlikely to expand the illumination region on the second diffraction element 70. Therefore, as illustrated in FIG. 10, the ray shape of the image light used in consideration of oblique incidence is distorted such that the width in the x direction decreases with increasing distance toward the +y side. The flux shape of the image light used in consideration of oblique incidence in this manner depends on the incidence status of the negative-side light rays MK and the positive-side light rays PK.

Incidentally, the ray shape of the image light on the second diffraction element 70 needs to be corrected between the first optical unit L10 and the third optical unit L30. In order for the first diffraction element 50 and the second diffraction element 70 to satisfy the conjugate relationship or the substantially conjugate relationship as described above, the incident shape of the image light needs to be equal between the first diffraction element 50 and the second diffraction element 70. Accordingly, the first diffraction element 50 and the second diffraction element 70 are precluded from being utilized for correction of the ray shape of the image light. Thus, the ray shape of the image light may be corrected as illustrated in FIG. 10 by using the third optical unit L30.

However, when the third optical unit L30 is used to correct the ray shape of the image light, the pupil diameter or the screen size is increased, leading to an increase in aberration. This results in a new problem of a reduced resolution of the image.

In contrast, in the optical system 10 of the present exemplary embodiment, as illustrated in FIG. 3, a prism member 45 that corrects the ray shape of the image light L0 is provided between the second optical unit L20 and the fourth optical unit L40. In the present exemplary embodiment, the prism member 45 is provided between the third optical unit L30 and the fourth optical unit L40, and the ray shape of the image light L0 obliquely incident on the second diffraction element 70 is pre-corrected to allow the image light L0 to be formed to have a desired ray shape such as a circular shape on the second diffraction element 70 in.

As illustrated in FIG. 3, in the optical system 10 of the present exemplary embodiment, the first optical unit L10, the second optical unit L20, the third optical unit L30, and the fourth optical unit L40 are disposed along one side of a curve MC (predetermined curve) of profile of the observer.

The prism member 45 of the present exemplary embodiment is provided on the third optical unit L30 side of the second intermediate image P2. An incident surface and an exit surface of the prism member 45 each include a curved surface having a curvature. The curved surface may be, for example, a spherical surface, an aspheric surface, a cylindrical surface, or a free-form surface. By thus configuring the incident surface and the exit surface using curved surfaces, the degree of freedom of image light correction can be improved. Note that the incident surface and the exit surface of the prism member 45 may be configured using planar surfaces.

The flux shape of the image light used in consideration of oblique incidence, illustrated in FIG. 10, varies depending on the incidence status of the negative-side light rays MK and the positive-side light rays PK. In other words, the shape of the prism member 45 is uniquely determined by the incidence status of the negative-side light rays MK and the positive-side light rays PK.

The prism member 45 of the present exemplary embodiment is shaped to relatively increase the corrective force for the negative-side light rays MK incident on the second diffraction element 70 at a large incident angle, while relatively reducing the corrective force for the positive-side light rays PK incident on the second diffraction element 70 at a small incident angle.

More specifically, as illustrated in FIG. 3, the prism member 45 of the present exemplary embodiment is shaped to be thicker at the +y side through which the negative-side light rays MK pass than at the −y side through which the positive-side light rays PK pass. Since the prism member 45 is thicker at the region through which the negative-side light rays MK pass, the negative-side light rays MK can be strongly bent. Thus, by making the negative-side light rays MK thinner than the positive-side light rays PK, the ray shape of the image light can be corrected in advance as illustrated in FIG. 10.

As illustrated in FIG. 3, the prism member 45 of the present exemplary embodiment is shaped to have a thickness increasing consistently with distance from the curve MC of the profile. Here, an outer side is defined as a direction away from the curve MC on one side of the curve MC, that is, on the side where the optical system 10 on the curve MC is disposed, and an inner side is defined as a direction toward the curve MC on this side. That is, in other words, the prism member 45 is shaped to be thicker on the outer side of the curve MC, which is far from the face of the observer, than on the inner side of the curve MC, which is close to the face of the observer.

Note that the shape of the prism member 45 also varies depending on the position at which the prism member 45 is disposed. For example, in FIG. 3, the prism member 45 is disposed on the third optical unit L30 side of the formation position of the second intermediate image P2. However, the prism member 45 may be disposed on the fourth optical unit L40 side of the formation position of the second intermediate image P2. In this case, the relationship between the incident positions of the negative-side light rays MK and the positive-side light rays PK to the prism member 45 is reverse to the relationship illustrated in FIG. 3. Thus, the prism member 45 is shaped to be thicker on the −y side than on the +y side.

According to the optical system 10 of the present exemplary embodiment, four conditions (conditions 1, 2, 3, and 4) described below can be satisfied.

Condition 1: the light rays emitted from one point of the image light generating device 31 are formed into one point on the retina E0.

Condition 2: an entrance pupil of the optical system and the pupil of the eye are conjugated.

Condition 3: the first diffraction element 50 and the second diffraction element 70 are appropriately disposed so as to compensate for peripheral wavelengths.

Condition 4: the first diffraction element 50 and the second diffraction element 70 are in the conjugate relationship or the substantially conjugate relationship.

More specifically, as can be understood from the solid line La illustrated in FIG. 9, Condition 1, where rays of light emitted from one point of the image light generating device 31 form an image as one point on a retina E0, is satisfied. Consequently, an observer can visibly recognize one pixel. As can be understood from the solid line La illustrated in FIG. 9, Condition 2, where an entrance pupil of the optical system 10 and a pupil μl of an eye E are in a conjugate relationship (conjugate relationship of pupils), is satisfied. Consequently, the entire image generated by the image light generating device 31 can be visibly recognized. Condition 3, where the first diffraction element 50 and the second diffraction element 70 are properly arranged so as to compensate for a peripheral wavelength, is satisfied. Consequently, color aberration occurring in the second diffraction element 70 can be canceled by performing wavelength compensation.

According to the optical system 10 of this exemplary embodiment, the prism member 45 provided between the third optical unit L30 and the fourth optical unit L40 corrects the ray shape of the image light L0 to be obliquely incident on the second diffraction element 70 in advance. This can make an incident state of the image light in the first diffraction element 50 and an incident state of the image light in the second diffraction element 70 the same as each other. Thus, according to the optical system 10 of this exemplary embodiment, even when image light is obliquely incident on the second diffraction element 70, Condition 4, where the first diffraction element 50 and the second diffraction element 70 are in a conjugate or substantially conjugate relationship as indicated by the dashed line Lc of FIG. 9, can be satisfied. Thus, the first diffraction element 50 and the second diffraction element 70 can cause rays of light to enter a position with the same interference patterns, and therefore the wavelength compensation described above can be properly performed. As a result, deterioration in resolution of image light can be satisfactorily prevented.

In the optical system 10 of this exemplary embodiment, a cover member that covers the second optical unit L20 and the third optical unit L30 may be provided. In this case, the prism member 45 may be formed by a part of the cover member. With this configuration, reduction in assembly tolerance can be achieved by integrating the prism member 45 and the cover member with each other.

Second Exemplary Embodiment

Next, an optical system according to a second exemplary embodiment will be described. The difference between this exemplary embodiment and the exemplary embodiment described above lies in the positions at which the prism member is arranged, and the other configuration is the same. Thus, a member the same as that of the exemplary embodiment described above will be given an identical reference sign, and detailed description thereof will be omitted.

Figure 11:
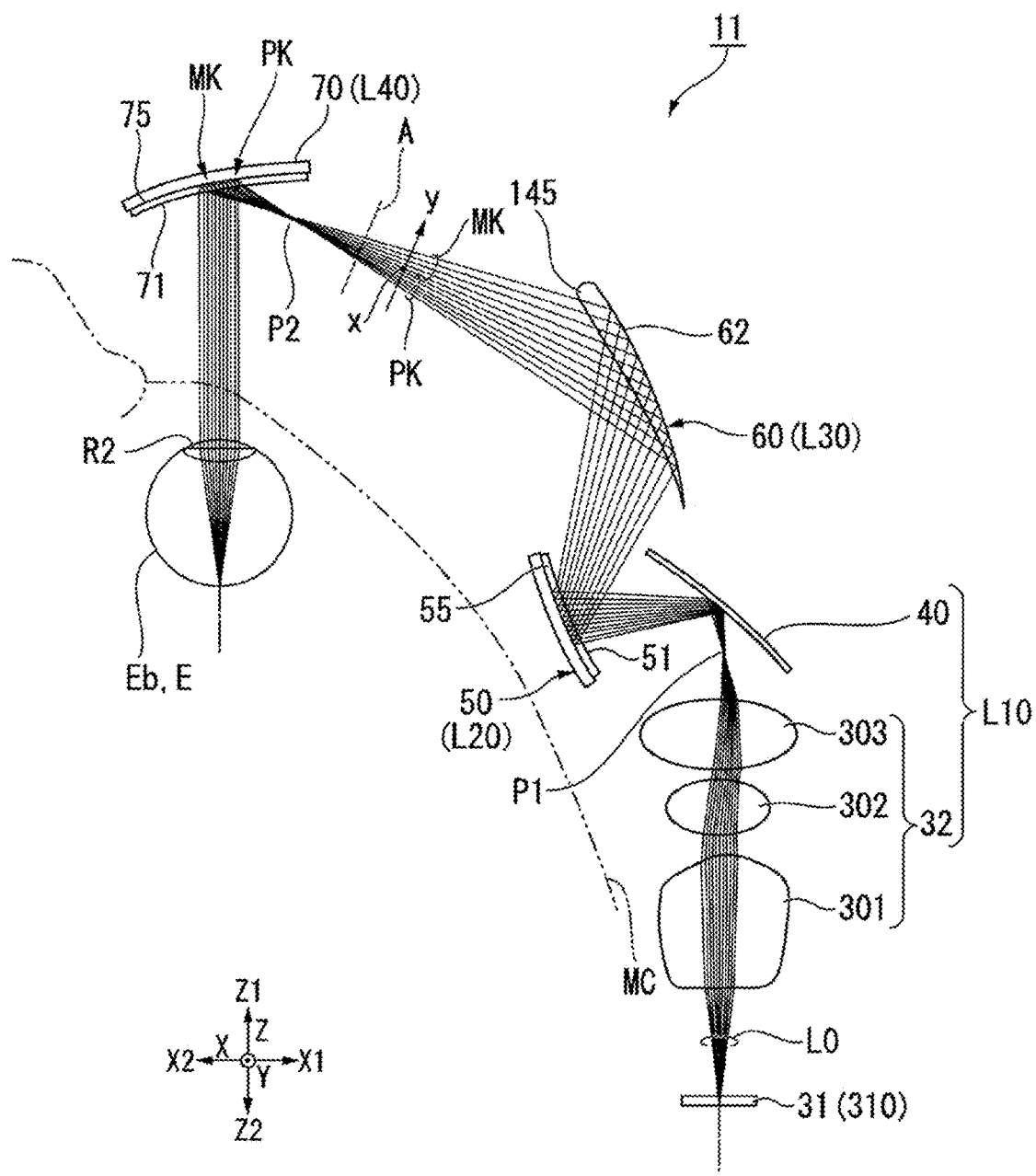
FIG. 11 is a view illustrating a configuration of an optical system of a second exemplary embodiment.

FIG. 11 is a diagram illustrating a configuration of an optical system according to this exemplary embodiment.

As illustrated in FIG. 11, in an optical system 11 of this exemplary embodiment, a prism member 145 is provided between the second optical unit L20 and the fourth optical unit L40. The prism member 145 is provided with the mirror 62 on a back surface on an opposite side of the light incident side, and thereby serves as the light guiding system 60 constituting the third optical unit L30.

The prism member 145 corrects the ray shape of the image light L0 to be obliquely incident on the second diffraction element 70 in advance. In this manner, the prism member 145 can cause the image light L0 to have a desired ray shape of light on the second diffraction element 70.

The prism member 145 has such a shape that correction power for the negative-side light rays of light MK to enter the second diffraction element 70 with a large incident angle with respect to the second diffraction element 70 is relatively increased, and correction power for the positive-side light rays of light PK to enter the second diffraction element 70 with a small incident angle with respect to the second diffraction element 70 is relatively reduced.

Specifically, as illustrated in FIG. 11, the prism member 145 of this exemplary embodiment has such a shape that the thickness of the mirror 62 on the front side Z1 through which the negative-side light rays of light MK pass is larger than the thickness of the mirror 62 on the rear side Z2 through which the positive-side light rays of light PK pass. Accordingly, in the prism member 145, the thickness of an area through which the negative-side light rays of light MK pass is large, and therefore the prism member 145 can bend the negative-side light rays of light MK at a large angle. Thus, the ray shape of image light can be corrected into the shape illustrated in FIG. 10 in advance by narrowing the negative-side light rays of light MK further than the positive-side light rays of light PK.

Also in the optical system 11 of this exemplary embodiment, the four conditions described above can be satisfied.

According to the optical system 11 of this exemplary embodiment, the prism member 145 provided between the third optical unit L30 and the fourth optical unit L40 corrects the ray shape of the image light L0 to be obliquely incident on the second diffraction element 70 in advance. This can make an incident state of the image light in the first diffraction element 50 and an incident state of the image light in the second diffraction element 70 the same as each other. Thus, according to the optical system 11 of this exemplary embodiment, even when image light is obliquely incident on the second diffraction element 70, deterioration in resolution of image light can be satisfactorily prevented by properly performing the wavelength compensation described above.

In the optical system 11 of this exemplary embodiment, the prism member 145 includes the mirror 62, and thereby serves as the third optical unit L30. Consequently, assembly tolerance can be reduced, and increase in the number of components can be prevented.

Third Exemplary Embodiment

Next, an optical system according to a third exemplary embodiment will be described. The difference between this exemplary embodiment and the exemplary embodiments described above lies in the positions at which the prism member is arranged, and the other configuration is the same. Thus, a member the same as that of the exemplary embodiment described above will be given an identical reference sign, and detailed description thereof will be omitted.

Figure 12:
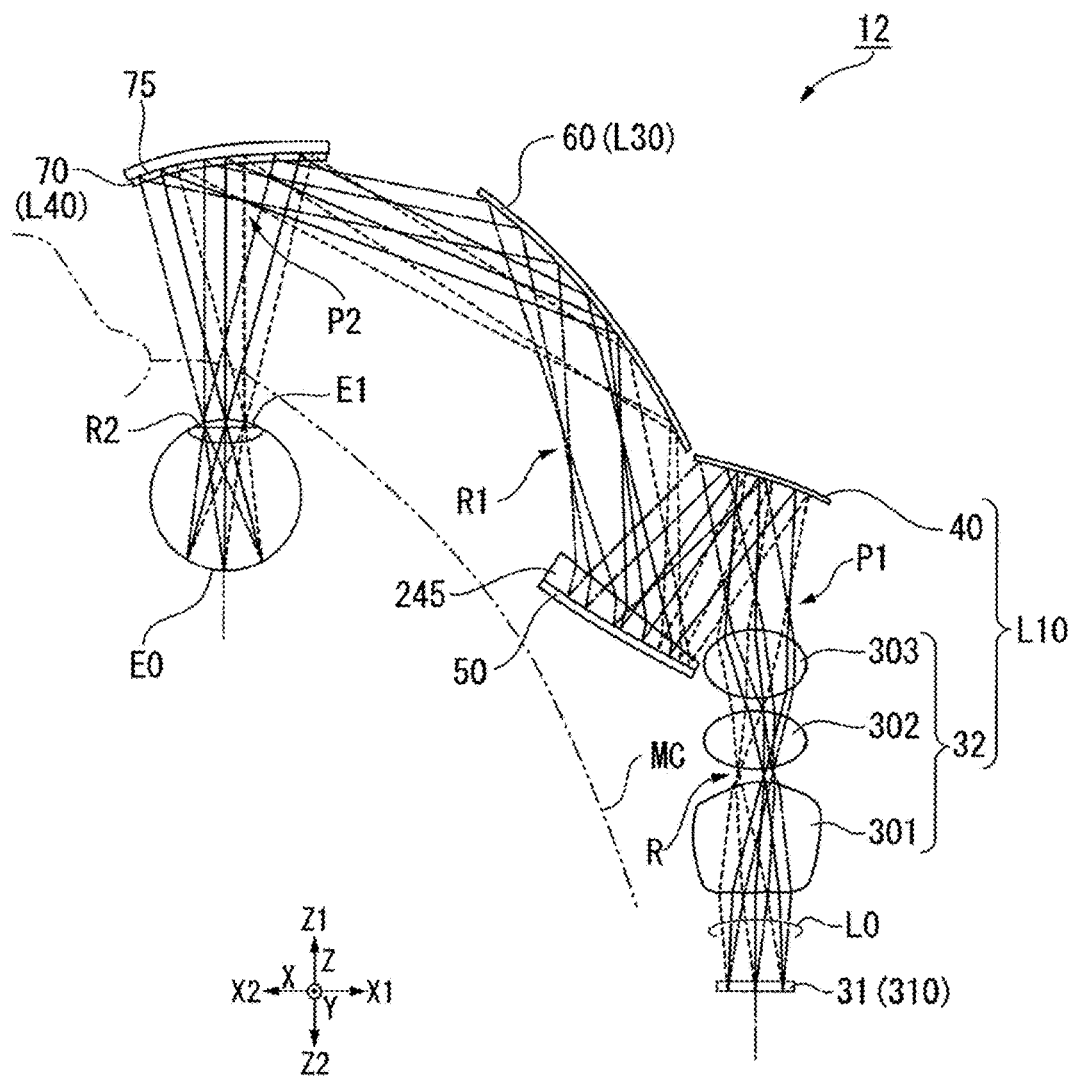
FIG. 12 is a view illustrating a configuration of an optical system of a third exemplary embodiment.

FIG. 12 is a diagram illustrating a configuration of an optical system according to this exemplary embodiment. In FIG. 12, rays of light emitted from three pixels of the image light generating device 31 are illustrated, and the rays of light are illustrated with three respective lines.

As illustrated in FIG. 12, in an optical system 12 of this exemplary embodiment, a prism member 245 is provided between the second optical unit L20 and the fourth optical unit L40 on an optical path of the image light L0. In other words, it can be said that, in the optical system 12 of this exemplary embodiment, the prism member 245 is provided between the first optical unit L10 and the second optical unit L20 on an optical path of the image light L0. More specifically, the prism member 245 is provided on a light incident surface side of the first diffraction element 50 constituting the second optical unit L20.

Being provided between the second optical unit L20 and the third optical unit L30, the prism member 245 corrects the ray shape of the image light L0 to be obliquely incident on the second diffraction element 70 in advance. In this manner, the prism member 245 has a function of causing the image light L0 to have a desired ray shape of light on the second diffraction element 70. The prism member 245 has such a shape that correction power for the negative-side light rays of light MK to enter the second diffraction element 70 with a large incident angle with respect to the second diffraction element 70 is relatively increased, and correction power for the positive-side light rays of light PK to enter the second diffraction element 70 with a small incident angle with respect to the second diffraction element 70 is relatively reduced.

In the optical system 12 of this exemplary embodiment, the first optical unit L10, the second optical unit L20, the third optical unit L30, and the fourth optical unit L40 are arranged along one side of the curve line MC (predetermined curve line) of the contour of an observer.

Specifically, as illustrated in FIG. 12, the prism member 245 of this exemplary embodiment has such a shape that the thickness on an opposite side of the first diffraction element 50 from the projection optical system 32 through which rays of light indicated by one-dot-one-dash lines and corresponding to the negative-side light rays of light MK pass is larger than the thickness on the projection optical system 32 side of the first diffraction element 50 through which rays of light indicated by dotted lines and corresponding to the positive-side light rays of light PK pass.

In the prism member 245 of this exemplary embodiment, the thickness of an area through which the negative-side light rays of light MK pass is large, and therefore the prism member 245 of this exemplary embodiment can bend the negative-side light rays of light MK at a large angle. Thus, the ray shape of image light can be corrected into the shape illustrated in FIG. 10 in advance by narrowing the negative-side light rays of light MK further than the positive-side light rays of light PK.

In the prism member 245 of this exemplary embodiment, the thickness on an outer side farther from the curve line MC of the contour of the face of an observer is smaller than the thickness on an inner side closer to the curve line MC. In other words, it can be said that the prism member 245 of this exemplary embodiment has such a shape that the thickness on an outer side of the curve line MC being a side farther from the face of an observer is smaller than the thickness on an inner side of the curve line MC being a side closer to the face of an observer.

Also in the optical system 12 of this exemplary embodiment, the four conditions described above can be satisfied.

According to the optical system 12 of this exemplary embodiment, the prism member 245 integrally provided with the first diffraction element 50 corrects the ray shape of the image light L0 to be obliquely incident on the second diffraction element 70 in advance. This can make an incident state of the image light in the first diffraction element 50 and an incident state of the image light in the second diffraction element 70 the same as each other. Thus, according to the optical system 12 of this exemplary embodiment, even when image light is obliquely incident on the second diffraction element 70, deterioration in resolution of image light can be satisfactorily prevented by properly performing the wavelength compensation described above.

Incidentally, for example, the optical system 12 of this exemplary embodiment is designed such that an irradiation position of object light and a concentration position of reference light when interference patterns of the first diffraction element 50 are formed substantially correspond to a pupil position. In this manner, efficiency of a pupil position that determines an angle of view of image light is enhanced, so that uniform light is caused to enter eyes of an observer.

If the first diffraction element 50 satisfies Bragg's diffraction condition, image light can be most efficiently diffracted toward the second diffraction element 70. Here, to satisfy Bragg's diffraction condition, it is sufficient that a pupil R corresponding to an object point of the first diffraction element 50 and an intermediate image of image light be arranged so as to match each other.

However, in the optical system 12 of this exemplary embodiment, as illustrated in FIG. 12, positions of the intermediate images P1 and P2 of image light and positions of the pupils R and R1 are different. Specifically, the first intermediate image P1 of image light is located nearer the first diffraction element 50 than the pupil R corresponding to an object point of the first diffraction element 50. Therefore, in the optical system 12 of this exemplary embodiment, the first diffraction element 50 does not match Bragg's diffraction condition. Thus, light that does not match Bragg's condition is generated, and diffraction efficiency is reduced.

In view of this, in the optical system 12 of this exemplary embodiment, the prism member 245 is integrally provided on a light incident surface side of the first diffraction element 50 as described above, such that the prism member 245 is arranged between the first optical unit L10 and the second optical unit L20. With this condition, the prism member 245 has a function of enhancing diffraction efficiency of the first diffraction element 50 as will be described later.

In the optical system 12 of this exemplary embodiment, image light reflected by the mirror 40 enters the first diffraction element 50 via the prism member 245. The image light is refracted when the image light enters the prism member 245.

Here, from a viewpoint of the first diffraction element 50, an incident angle of image light with respect to the first diffraction element 50 is corrected into a prism shape, and thus it can be considered that image light is emitted from a position closer to an object point. Therefore, when image light transmits through the prism member 245, ostensibly, the image light enters the first diffraction element 50 in a state of satisfying Bragg's diffraction condition rather than being emitted from a position close to an object point. Thus, light that does not match Bragg's condition is reduced.

Therefore, according to the optical system 12 of this exemplary embodiment, the number of components is not increased, and both prevention of deterioration in resolution of image light in the above-mentioned case where image light is obliquely incident on the second diffraction element 70 and enhancement in diffraction efficiency of the first diffraction element 50 can be achieved, by integrally providing the prism member 245 with the first diffraction element 50. In the optical system 12 of this exemplary embodiment, assembly tolerance can be reduced, and increase in the number of components can be prevented, by integrating the prism member 245 and the first diffraction element 50 with each other.

First Modified Example

Figure 13:
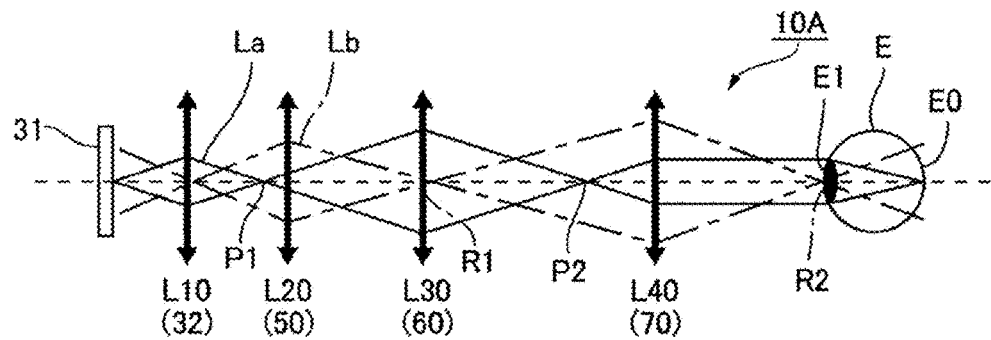
FIG. 13 is a diagram illustrating light rays in an optical system according to a first modified example.

FIG. 13 is a diagram of rays of light of an optical system 10A according to a first modified example. As illustrated in FIG. 13, in the optical system 10A of this modified example, a first optical unit L10 (projection optical system 32) having positive power, a second optical unit L20 having positive power and including the first diffraction element 50, a third optical unit L30 (light guiding system 60) having positive power, and a fourth optical unit L40 having positive power and including the reflection-type second diffraction element 70 are provided, along an optical path of image light emitted from the image light generating device 31.

A focal length of the first optical unit L10 is 4L/11. A focal length of the second optical unit L20 is 6L/11. A focal length of the third optical unit L30 is 3L/4. A focal length of the fourth optical unit L40 is L. Thus, a ratio between an optical path length from the second optical unit L20 to the third optical unit L30 and an optical path length from the third optical unit L30 to the fourth optical unit L40 is 1:2. An optical path length from the second optical unit L20 to the third optical unit L30 is shorter than an optical path length from the third optical unit L30 to the fourth optical unit L40. Accordingly, even when the optical system 10 is downsized, a field of view is less liable to be blocked by the third optical unit L30.

Also in this modified example, similarly to the configuration of the first exemplary embodiment described with reference to FIG. 9, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2. In this modified example, similarly to the configuration of the first exemplary embodiment, the first intermediate image P1 is formed between the first optical unit L10 (projection optical system 32) and the second optical unit L20 (first diffraction element 50).

Also in the optical system 10A of this modified example, similarly to the configuration of the first exemplary embodiment, Condition 1, where rays of light emitted from one point of the image light generating device 31 form an image as one point on a retina E0, is satisfied. Condition 2, where an entrance pupil of the optical system 10A and a pupil E1 of an eye E are in a conjugate relationship (conjugate relationship of pupils), is satisfied. Condition 3, where the first diffraction element 50 and the second diffraction element 70 are properly arranged, is satisfied. Condition 4, where the first diffraction element 50 and the second diffraction element 70 are in a conjugate or substantially conjugate relationship, is satisfied. Consequently, in the first diffraction element 50 and the second diffraction element 70, rays of light can be caused to enter a position with the same interference patterns, and color aberration can be canceled by properly performing wavelength compensation. As a result, deterioration in resolution of image light can be prevented.

Also in the optical system 10A of this modified example, similarly to the optical systems 10, 11, and 12 according to the exemplary embodiments described above, the ray shape of the image light L0 can be corrected into a shape in consideration of oblique incidence by including any of the prism members 45, 145, and 245. Thus, reduction in resolution, which is caused when image light is obliquely incident on the second diffraction element 70, can be prevented. As a result, according to the optical system 10A of this modified example, high image quality can be achieved.

Second Modified Example

Figure 14:
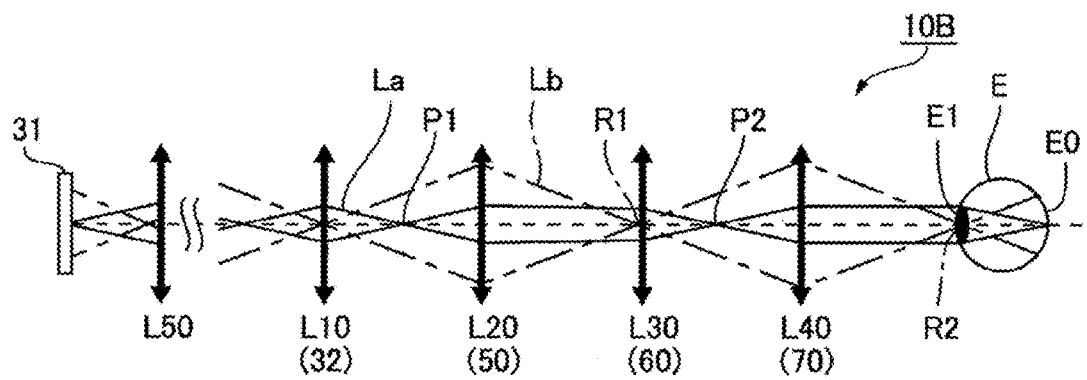
FIG. 14 is a diagram of light rays in an optical system according to a second modified example.

FIG. 14 is a diagram of rays of light of an optical system 10B according to a second modified example. As illustrated in FIG. 14, in the optical system 10B of this modified example, a first optical unit L10 (projection optical system 32) having positive power, a second optical unit L20 having positive power and including the first diffraction element 50, a third optical unit L30 (light guiding system 60) having positive power, and a fourth optical unit L40 having positive power and including the reflection-type second diffraction element 70 are provided, along an optical path of image light emitted from the image light generating device 31. In this modified example, a fifth optical unit L50 is provided between the image light generating device 31 and the projection optical system 32.

Also in this modified example, similarly to the configuration of the first exemplary embodiment described with reference to FIG. 9, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2. Also in this modified example, similarly to the configuration of the first exemplary embodiment, the first intermediate image P1 is formed between the first optical unit L10 (projection optical system 32) and the second optical unit L20 (first diffraction element 50). Specifically, in the configuration of the first exemplary embodiment described with reference to FIG. 9, the position at which the image light generating device 31 is arranged is regarded as an imaginary panel position. In this case, in the configuration illustrated in FIG. 14, the image light generating device 31 is arranged on an opposite side of the first optical unit L10 from the imaginary panel position. A length between the image light generating device 31 and the first optical unit L10 is larger than a length between the image light generating device 31 and the first optical unit L10 in the configuration of the first exemplary embodiment described with reference to FIG. 9. Also in such a case, the fifth optical unit L50 is provided between the image light generating device 31 and the projection optical system 32. Consequently, after reaching the first optical unit L10, rays of light emitted from the image light generating device 31 travel in a similar manner as in the configuration of the first exemplary embodiment described with reference to FIG. 9.

Therefore, also in the optical system 10B of this modified example, similarly to the configuration of the first exemplary embodiment, Condition 1, where rays of light emitted from one point of the image light generating device 31 form an image as one point on a retina E0, is satisfied. Condition 2, where an entrance pupil of the optical system 10B and a pupil E1 of an eye E are in a conjugate relationship (conjugate relationship of pupils), is satisfied. Condition 3, where the first diffraction element 50 and the second diffraction element 70 are properly arranged, is satisfied. Condition 4, where the first diffraction element 50 and the second diffraction element 70 are in a conjugate or substantially conjugate relationship, is satisfied. Consequently, in the first diffraction element 50 and the second diffraction element 70, rays of light can be caused to enter a position with the same interference patterns, and color aberration can be canceled by properly performing wavelength compensation. As a result, deterioration in resolution of image light can be prevented.

Also in the optical system 10B of this modified example, similarly to the optical systems 10, 11, and 12 according to the exemplary embodiments described above, the ray shape of the image light L0 can be corrected into a shape in consideration of oblique incidence by including any of the prism members 45, 145, and 245. Thus, reduction in resolution, which is caused when image light is obliquely incident on the second diffraction element 70, can be prevented. As a result, according to the optical system 10B of this modified example, high image quality can be achieved.

Third Modified Example

Figure 15:
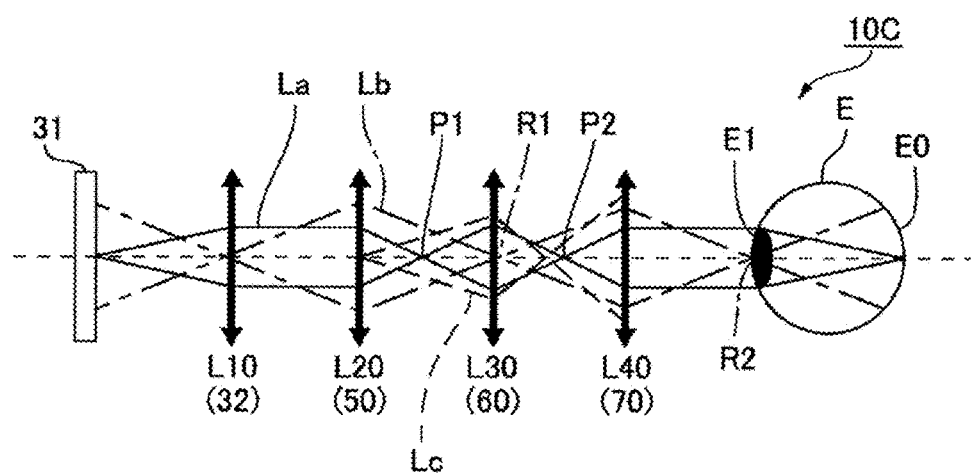
FIG. 15 is a diagram of light rays in an optical system according to a third modified example.

FIG. 15 is a diagram of rays of light of an optical system 10C according to a third modified example. As illustrated in FIG. 15, in the optical system 10C of this modified example, a first optical unit L10 (projection optical system 32) having positive power, a second optical unit L20 having positive power and including the first diffraction element 50, a third optical unit L30 (light guiding system 60) having positive power, and a fourth optical unit L40 having positive power and including the reflection-type second diffraction element 70 are provided, along an optical path of image light emitted from the image light generating device 31.

Also in this modified example, similarly to the configurations of the first exemplary embodiment, the first modified example, and the second modified example, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2.

In this modified example, unlike the configurations of the first exemplary embodiment, the first modified example, and the second modified example, the first intermediate image P1 is formed between the second optical unit L20 (first diffraction element 50) and the third optical unit L30 (light guiding system 60).

Also in the optical system 10C, similarly to the configuration of the first exemplary embodiment, Condition 1, where rays of light emitted from one point of the image light generating device 31 form an image as one point on a retina E0, is satisfied. Condition 2, where an entrance pupil of the optical system 10C and a pupil E1 of an eye E are in a conjugate relationship (conjugate relationship of pupils), is satisfied. Condition 3, where the first diffraction element 50 and the second diffraction element 70 are properly arranged, is satisfied. Note that, in the optical system 10C of this modified example, Condition 4, where the first diffraction element 50 and the second diffraction element 70 are in a conjugate or substantially conjugate relationship, is not satisfied. Also in this case, the third optical unit L30 can cause light polarized by the first diffraction element 50 to be shifted from a specific wavelength of the image light from one point of the image light generating device 31 to enter a predetermined range of the second diffraction element 70. Therefore, the problem that light enters a place with different interference patterns is compensated by the third optical unit L30. Thus, light in a peripheral wavelength of the specific wavelength can also enter near the light in the specific wavelength, and color aberration can be substantially canceled by performing wavelength compensation. As a result, deterioration in resolution can be prevented. Specifically, according to the optical system 10C of this modified example, as compared to the configuration of the first exemplary embodiment, for example, a wavelength compensation effect is lower, but a constant wavelength compensation effect can be achieved when an aperture ratio is small.

Also in the optical system 10C of this modified example, similarly to the optical systems 10, 11, and 12 according to the exemplary embodiments described above, the ray shape of the image light L0 can be corrected into a shape in consideration of oblique incidence by including any of the prism members 45, 145, and 245. Thus, reduction in resolution, which is caused when image light is obliquely incident on the second diffraction element 70, can be prevented. As a result, according to the optical system 10C of this modified example, high image quality can be achieved.

Fourth Modified Example

Figure 16:
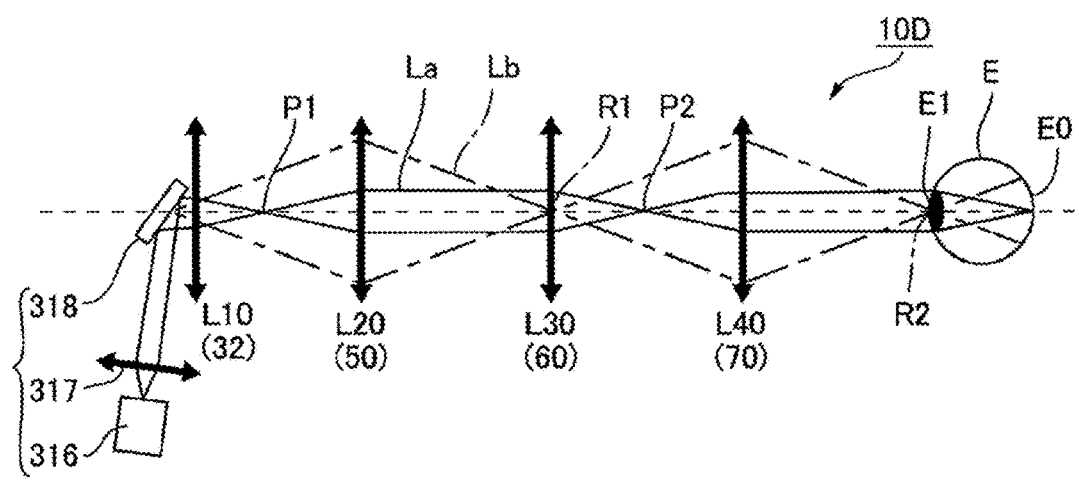
FIG. 16 is a diagram of light rays in an optical system according to a fourth modified example.
Figure 17:
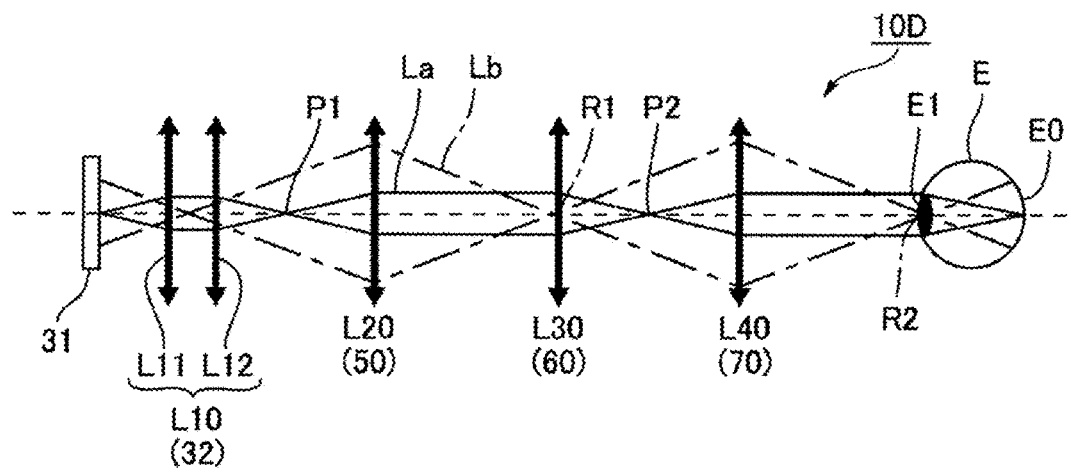
FIG. 17 is an explanatory diagram of a first optical unit according to the present modified example.

FIG. 16 is a diagram of rays of light of an optical system 10D according to a fourth modified example. FIG. 17 is an explanatory diagram of the first optical unit L10 according to this modified example. As illustrated in FIG. 16, similarly to the configuration of the first exemplary embodiment described with reference to FIG. 9, in the optical system 10D of this modified example, a first optical unit L10 (projection optical system 32) having positive power, a second optical unit L20 having positive power and including the first diffraction element 50, a third optical unit L30 (light guiding system 60) having positive power, and a fourth optical unit L40 having positive power and including the reflection-type second diffraction element 70 are provided. Here, the image light generating device 31 includes a laser light source 316, a collimate lens 317, and a micro mirror device 318. The image light generating device 31 drives the micro mirror device 318 to scan the laser light source 316. In this manner, the image light generating device 31 generates an image. Accordingly, the image light generating device 31 itself forms light of an angle of view.

Therefore, as illustrated in FIG. 17, as compared to a case where a pupil is formed between lenses L11 and L12 used in the first optical unit L10 in the configuration of the first exemplary embodiment described with reference to FIG. 9, the image light generating device 31 and the lens L11 are replaced by the laser light source 316, the collimate lens 317, and the micro mirror device 318 described above.

According to the optical system 10D, in a case where the display apparatus 100 is worn, even when temperature change occurs due to body temperature or heat of the display apparatus 100 itself and thereby a spectral width of laser light varies, for example, image quality of an image can be enhanced by means of wavelength compensation.

Also in the optical system 10D of this modified example, similarly to the optical systems 10, 11, and 12 according to the exemplary embodiments described above, the ray shape of the image light L0 can be corrected into a shape in consideration of oblique incidence by including any of the prism members 45, 145, and 245. Thus, reduction in resolution, which is caused when image light is obliquely incident on the second diffraction element 70, can be prevented. As a result, according to the optical system 10D of this modified example, high image quality can be achieved.

Fifth Modified Example

Figure 18:
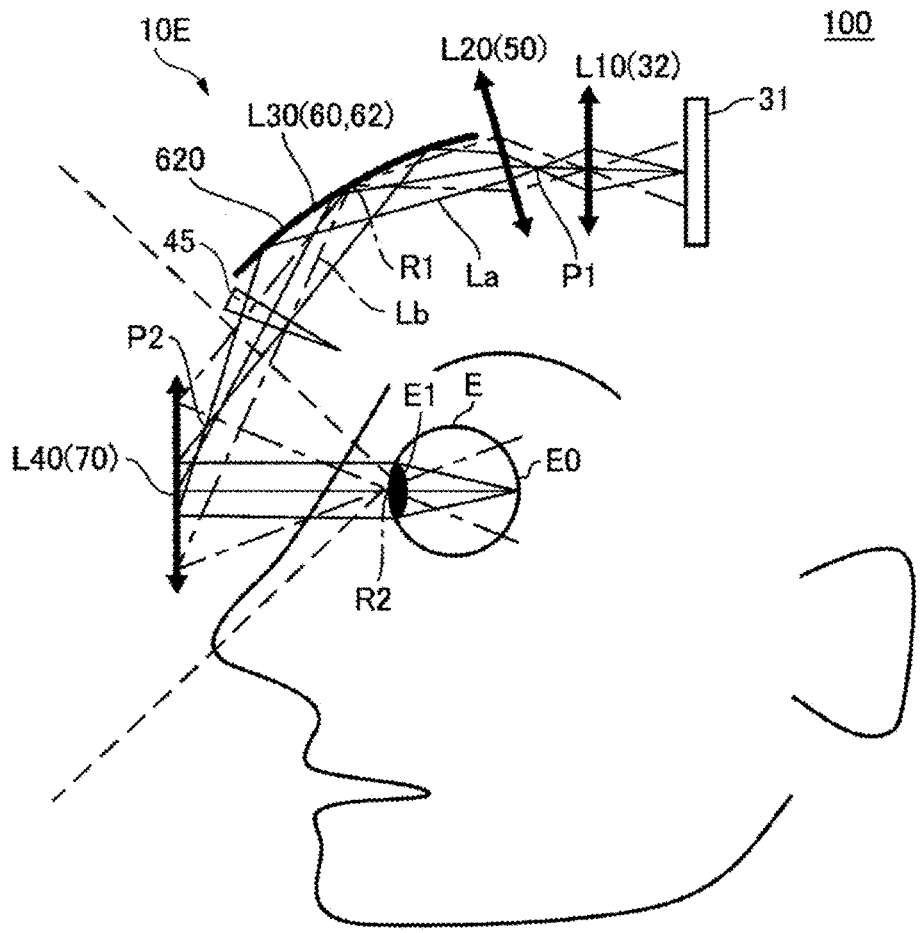
FIG. 18 is an explanatory diagram of an optical system according to a fifth modified example.

FIG. 18 is an explanatory diagram of an optical system 10E according to a fifth modified example. The optical system 10E illustrated in FIG. 18 is arranged along the vertical direction as illustrated in FIG. 2. The projection optical system 32, the first diffraction element 50, and the light guiding system 60 are arranged between the image light generating device 31 arranged at the top of the head and the second diffraction element 70 located in front of the eye E. In this modified example, the light guiding system 60 has positive power, and includes a mirror 62 including a reflection surface 620 with its center being concave with respect to a peripheral portion. The reflection surface 620 includes a spherical surface, an aspherical surface, or a free-form surface. In this modified example, the reflection surface 620 includes a free-form surface. The first diffraction element 50 has positive power, and includes a transmission-type volume holographic element and a lens that are integrated with each other. Note that the first diffraction element 50 itself may be configured to have positive power.

In the optical system 10E of this modified example, similarly to the first modified example described with reference to FIG. 13, a first optical unit L10 (projection optical system 32) having positive power, a second optical unit L20 having positive power and including the first diffraction element 50, a third optical unit L30 (mirror 62 of light guiding system 60) having positive power, and a fourth optical unit L40 having positive power and including the reflection-type second diffraction element 70 are provided, along an optical path of image light emitted from the image light generating device 31. Thus, a first intermediate image P1 of image light is formed between the first optical unit L10 and the third optical unit L30. A pupil R1 is formed near the third optical unit L30. A second intermediate image P2 of the image light is formed between the third optical unit L30 and the fourth optical unit L40. The fourth optical unit L40 collimates the image light to form an exit pupil R2.

In the optical system 10E of this modified example, similarly to the optical system 10 of the first exemplary embodiment, the prism member 45 is provided between the third optical unit L30 and the fourth optical unit L40. With this configuration, the ray shape of the image light L0 can be corrected into a shape in consideration of oblique incidence.

Here, the third optical unit L30 includes the mirror 62 having positive power. Accordingly, diverging rays of light diffracted by the second optical unit L20 are concentrated by the mirror 62. The concentrated light enters a point of the fourth optical unit L40 (second diffraction element 70) where light in a specific wavelength enters, or the concentrated light enters a region near the point.

Also in the optical system 10E of this modified example, similarly to the first modified example described with reference to FIG. 13, Condition 1, where rays of light emitted from one point of the image light generating device 31 form an image as one point on a retina E0, is satisfied. Condition 2, where an entrance pupil of the optical system 10E and a pupil E1 of an eye E are in a conjugate relationship (conjugate relationship of pupils), is satisfied. Condition 3, where the first diffraction element 50 and the second diffraction element 70 are properly arranged, is satisfied. Condition 4, where the first diffraction element 50 and the second diffraction element 70 are in a conjugate or substantially conjugate relationship, is satisfied. Consequently, in the first diffraction element 50 and the second diffraction element 70, rays of light can be caused to enter a position with the same interference patterns, and color aberration can be canceled by properly performing wavelength compensation. As a result, deterioration in resolution of image light can be prevented.

According to the optical system 10E of this modified example, the prism member 45 is included. Thus, higher image quality can be achieved by preventing reduction in resolution, which is caused when image light is obliquely incident on the second diffraction element 70.

Note that this modified example gives an example of a case of including the prism member 45. However, the prism members 145 and 245 may be combined together.

Sixth Modified Example

Figure 19:
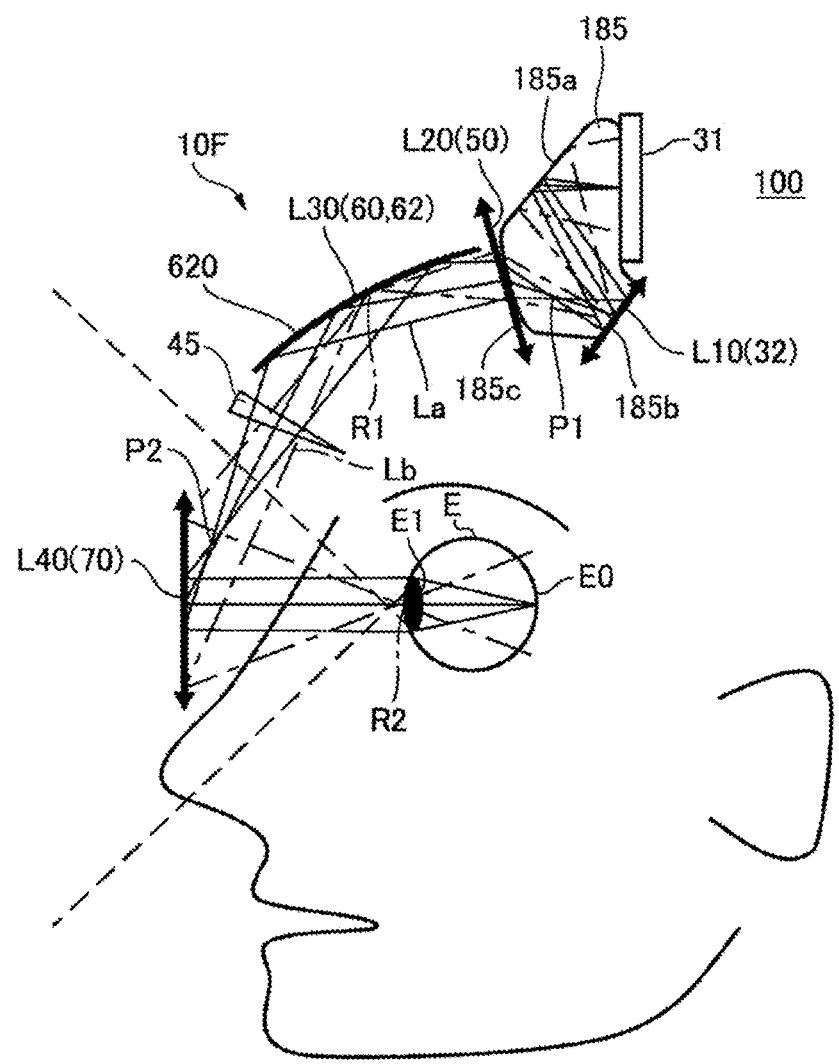
FIG. 19 is an explanatory diagram of a display device according to a sixth modified example.

FIG. 19 is an explanatory diagram of a display apparatus according to a sixth modified example. In the optical system 10E illustrated in FIG. 18, the first optical unit L10 (projection optical system 32) and the second optical unit L20 (first diffraction element 50) are separate from each other. However, in an optical system 10F of this modified example, as illustrated in FIG. 19, the first optical unit L10 (projection optical system) and the second optical unit L20 (first diffraction element 50) are integrated with each other. More specifically, the first optical unit L10 (projection optical system 32) includes a prism 185 including a plurality of reflection surfaces 185a and 185b. A light emission surface 185c of the prism 185 includes the second optical unit L20 (transmission-type first diffraction element 50).

The other configuration is the same as the configuration of the fifth modified example described with reference to FIG. 18. Accordingly, similarly to the aspect illustrated in FIG. 18, color aberration can be canceled by properly performing wavelength compensation. As a result, deterioration in resolution of image light can be prevented. With the use of the prism 185, the first optical unit L10 (projection optical system 32) and the second optical unit L20 (first diffraction element 50) are integrated with each other. Consequently, reduction in assembly tolerance and downsizing in a front and back direction of the head can be achieved, for example. Reduction in resolution, which is caused when image light is obliquely incident on the second diffraction element 70, can be prevented. As a result, higher image quality can be achieved.

Seventh Modified Example

Figure 20:
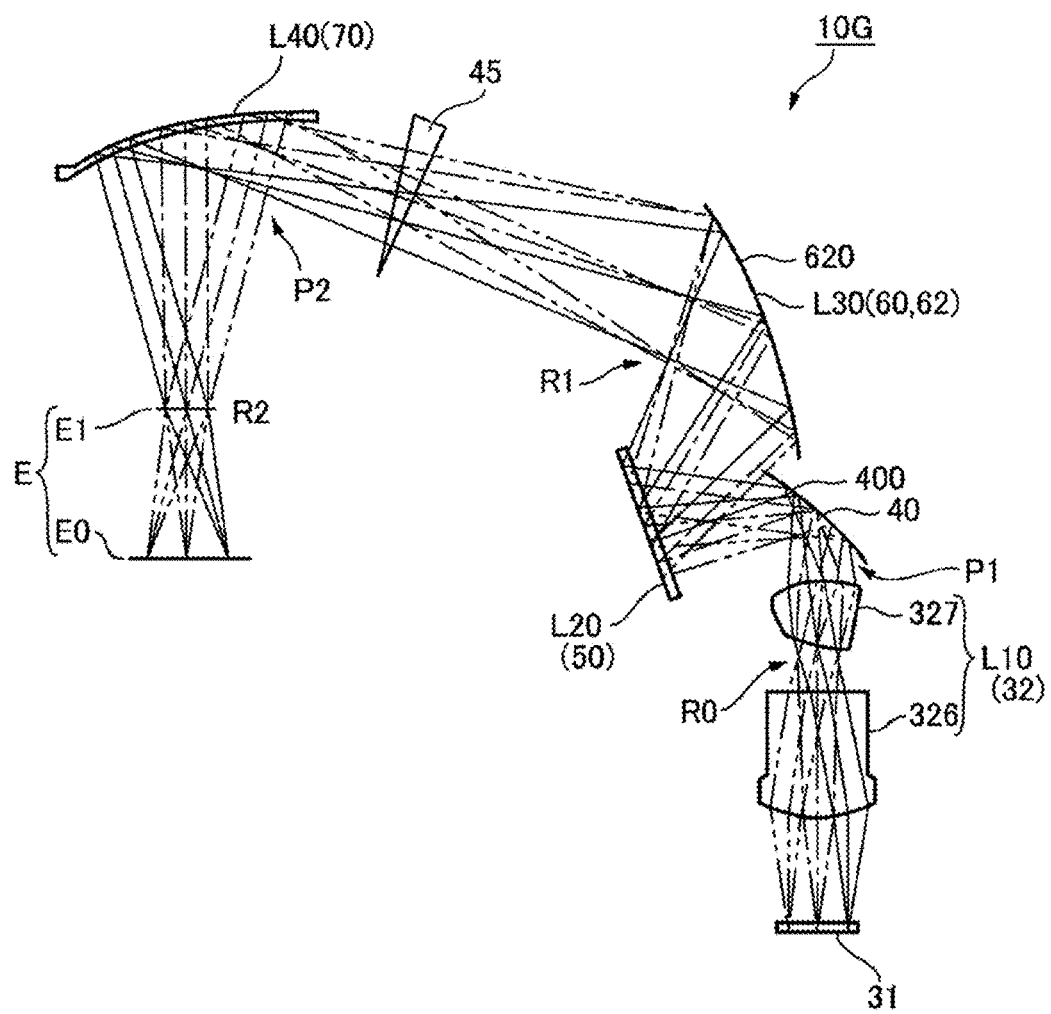
FIG. 20 is an explanatory diagram of a display device according to a seventh modified example.

FIG. 20 is an explanatory diagram of a display apparatus according to a seventh modified example. Similarly to the aspect described with reference to FIG. 1 and FIG. 3, in an optical system 10G illustrated in FIG. 20, the projection optical system 32, the first diffraction element 50, and the light guiding system 60 are arranged between the image light generating device 31 arranged at the side of the head and the second diffraction element 70 located in front of the eye E. In this modified example, the projection optical system 32 includes a rotationally symmetric lens 326 and a free form lens 327. The light guiding system 60 has positive power, and includes a mirror 62 including a reflection surface 620 with its center being concave with respect to a peripheral portion. The reflection surface 620 includes a spherical surface, an aspherical surface, or a free-form surface. In this modified example, the reflection surface 620 includes a free-form surface. The first diffraction element 50 includes a reflection volume hologram. A mirror 40 is arranged at some point in an optical path extending from the projection optical system 32 to the first diffraction element 50. The projection optical system 32 forms an intermediate image (first intermediate image P1) on a reflection surface of the mirror 40 or near the reflection surface. The mirror 40 has positive power, and includes a reflection surface 400 including a concave curved surface. When the reflection surface 400 of the mirror 40 has positive power, the mirror 40 may be included as a component of the projection optical system 32. In other words, when the mirror 40 has positive power, the first optical unit L10 may include the mirror 40. Note that the reflection surface 400 of the mirror 40 may include a flat surface, and the mirror 40 may not have power.

In the optical system 10G configured as described above, similarly to the first modified example described with reference to FIG. 13, a first optical unit L10 (projection optical system 32) having positive power, a second optical unit L20 having positive power and including the first diffraction element 50, a third optical unit L30 (mirror 62 of light guiding system 60) having positive power, and a fourth optical unit L40 having positive power and including the reflection-type second diffraction element 70 are provided, along an optical path of image light emitted from the image light generating device 31.

In the optical system 10G of this modified example, similarly to the optical system 10 of the first exemplary embodiment, the prism member 45 is provided between the third optical unit L30 and the fourth optical unit L40. With this configuration, the ray shape of image light can be corrected into a shape in consideration of oblique incidence.

In the optical system 10G of this modified example, the first optical unit L10 includes the plurality of lenses 326 and 327. The lens 326 out of the plurality of lenses 326 and 327 is a lens located closest to the image light generating device 31.

In the optical system 10G of this modified example, a pupil R0 is formed between the lens 326 and the lens 327 of the first optical unit L10. A pupil R1 is formed near the third optical unit L30. A second intermediate image P2 of image light is formed between the third optical unit L30 and the fourth optical unit L40. The fourth optical unit L40 collimates the image light to form an exit pupil R2.

In the optical system 10G of this modified example, the first intermediate image P1 is formed in the first optical unit L10 (projection optical system 32). The first intermediate image P1 and the second intermediate image P2 illustrated in FIG. 20 are intermediate images of image light diffused in the horizontal direction along the drawing sheet. Image light emitted from the image light generating device 31 is diffused in the vertical direction orthogonal to the drawing sheet of FIG. 20 as well as in the horizontal direction, and therefore an intermediate image of the image light diffused in the vertical direction is also present. In this modified example, an intermediate image in the vertical direction is present near an intermediate image in the horizontal direction.

Note that, in the optical system 10G of this modified example, the first intermediate image P1 is formed near the mirror 40, However, the first intermediate image P1 may be formed in the first optical unit L10 (projection optical system 32).

Figure 21:
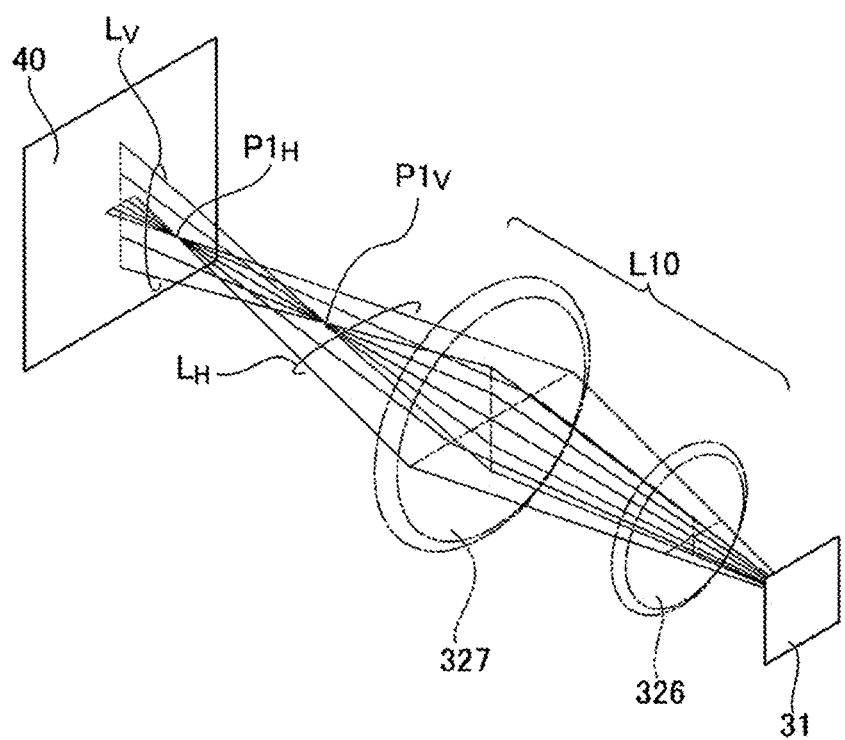
FIG. 21 is a diagram of light rays in a case where the position of an intermediate image varies in a horizontal direction and a vertical direction.

An intermediate image in the horizontal direction and an intermediate image in the vertical direction may be present at different positions. FIG. 21 is a diagram of rays of light in a case where positions of intermediate images in the horizontal direction and the vertical direction are different, and FIG. 21 is a diagram of rays of image light in the horizontal direction and the vertical direction. In FIG. 21, a reference sign $L_H$ represents image light in the horizontal direction. A reference sign $P1_H$ represents a first intermediate image of the image light $L_H$ in the horizontal direction. A reference sign $L_V$ represents image light in the vertical direction. A reference sign Ply represents a first intermediate image of the image light $L_V$ in the vertical direction. In FIG. 21, the image light generating device 31, the first optical unit L10 (projection optical system 32), and the mirror 40 that are arranged along an optical axis are schematically illustrated. In FIG. 21, the shapes of the lenses 326 and 327 constituting the projection optical system 32 are also simplified.

As illustrated in FIG. 21, the first intermediate image $P1_H$ in the horizontal direction is located near the mirror 40. The first intermediate image $P1_V$ in the vertical direction is arranged nearer the first optical unit L10 than the first intermediate image $P1_H$ in the horizontal direction.

FIG. 21 illustrates a case where positions of intermediate images are different between the horizontal direction and the vertical direction in the first intermediate images P1. However, positions may also be different between the horizontal direction and the vertical direction in the second intermediate images. When positions of intermediate images are different between the horizontal direction and the vertical direction in the first intermediate images P1, one of the first intermediate image $P1_H$ and the first intermediate image $P1_V$ may be formed in the first optical unit L10, and the other of the first intermediate image $P1_H$ and the first intermediate image Ply may be formed outside the first optical unit L10.

Also in the optical system 10G of this modified example, similarly to the first modified example described with reference to FIG. 13, Condition 1, where rays of light emitted from one point of the image light generating device 31 form an image as one point on a retina E0, is satisfied. Condition 2, where an entrance pupil of the optical system 10G and a pupil E1 of an eye E are in a conjugate relationship (conjugate relationship of pupils), is satisfied. Condition 3, where the first diffraction element 50 and the second diffraction element 70 are properly arranged, is satisfied. Condition 4, where the first diffraction element 50 and the second diffraction element 70 are in a conjugate or substantially conjugate relationship, is satisfied. Consequently, in the first diffraction element 50 and the second diffraction element 70, rays of light can be caused to enter a position with the same interference patterns, and color aberration can be canceled by properly performing wavelength compensation. As a result, deterioration in resolution of image light can be prevented.

According to the optical system 10G of this modified example, the prism member 45 is included. Thus, higher image quality can be achieved by preventing reduction in resolution, which is caused when image light is obliquely incident on the second diffraction element 70.

Note that this modified example gives an example of a case of including the prism member 45. However, the prism members 145 and 245 may be combined together.

An optical member in which high dispersion and low dispersion are combined is used for plastic, glass, or the like that constitutes a light-transmitting member out of members illustrated in FIG. 20. The mirror 62 is used in the third optical unit L30, and therefore the first optical unit L10 is achromatic. This shifts the centroid position of the optical system 10G toward the rear side Z2, which is advantageous in that burden on the nose of a user can be alleviated, for example. When a semi-transparent mirror layer or a mirror layer with angular selectivity is formed for the mirror 62 by processing a transparent member such as a transparent resin or glass with a sputtering method, for example, an outside area can be visibly recognized through the mirror 62.

Eighth Modified Example

Figure 22:
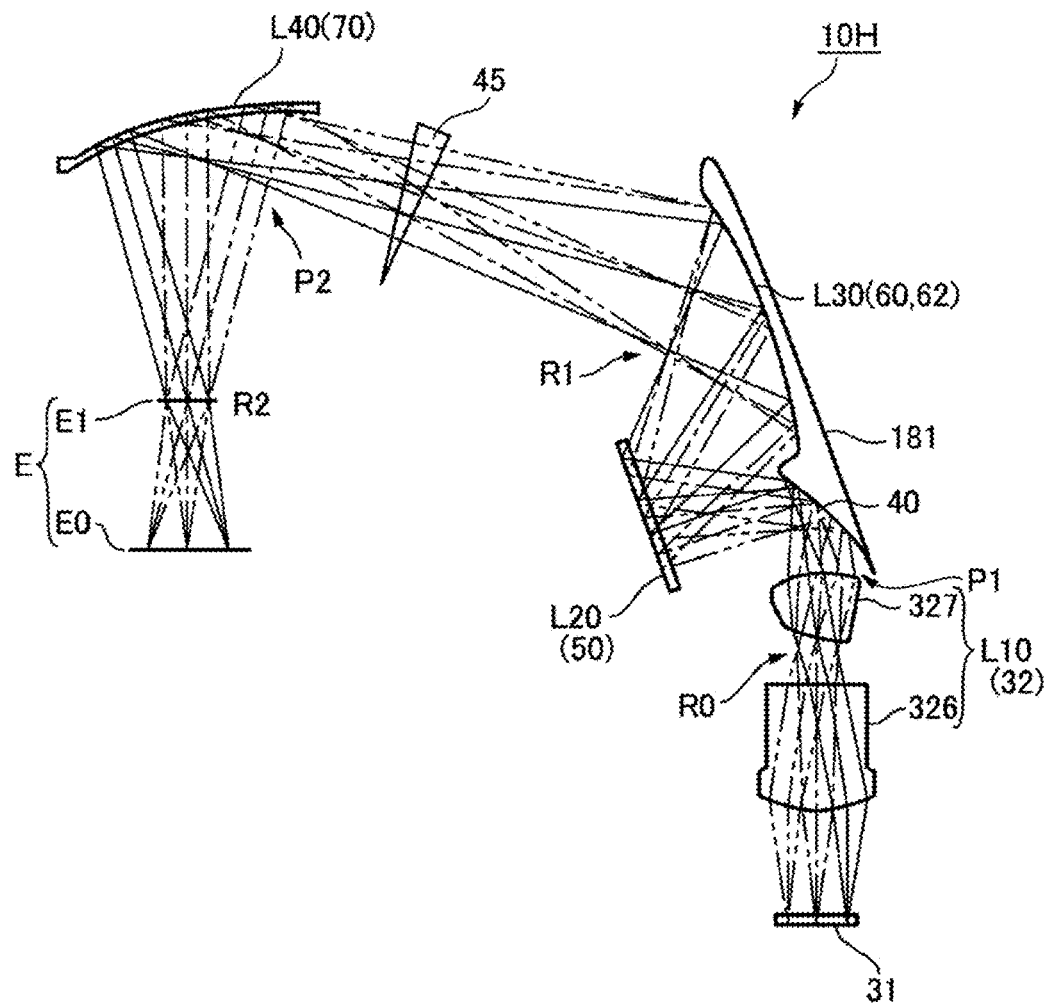
FIG. 22 is an explanatory diagram of a display device according to an eighth modified example.

FIG. 22 is an explanatory diagram of a display apparatus according to an eighth modified example. In an optical system 10H illustrated in FIG. 22, similarly to the seventh modified example described with reference to FIG. 20, the projection optical system 32 (first optical unit L10), the mirror 40, the first diffraction element 50 (second optical unit L20), and the mirror 62 of the light guiding system 60 (third optical unit L30) are arranged between the image light generating device 31 arranged at the side of the head and the second diffraction element 70 (fourth optical unit L40) located in front of the eye E.

In this modified example, the mirror 40 and the mirror 62 are formed at different surfaces of a common member 181. The other configuration is the same as the configuration of the seventh modified example illustrated in FIG. 20. Accordingly, similarly to the seventh modified example illustrated in FIG. 20, wavelength compensation can be properly performed. The mirror 40 and the mirror 62 are formed in the common member 181, and therefore reduction in assembly tolerance can be achieved, for example. The number of types of molds for manufacturing mirrors can be reduced, and therefore reduction in costs can be achieved.

Ninth Modified Example

Figure 23:
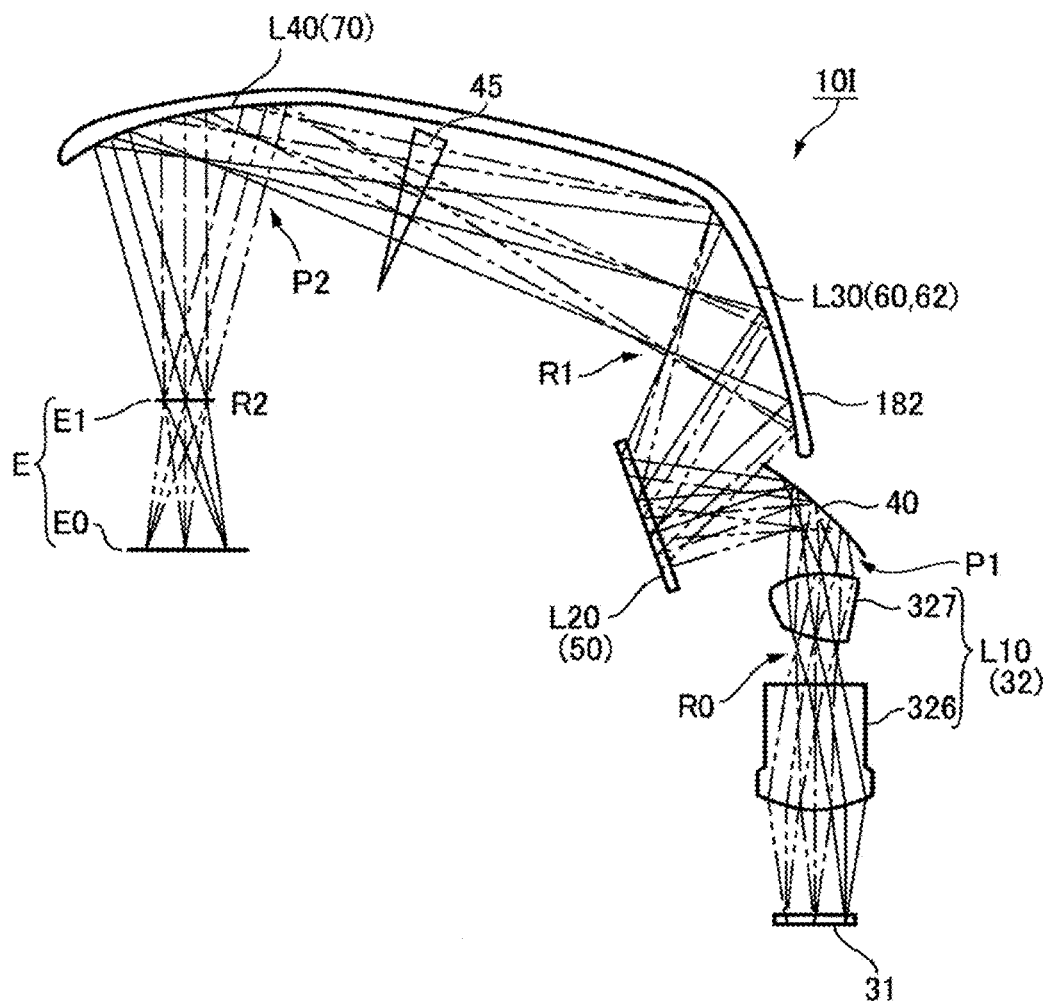
FIG. 23 is an explanatory diagram of a display device according to a ninth modified example.

FIG. 23 is an explanatory diagram of a display apparatus according to a ninth modified example. In an optical system 10I illustrated in FIG. 23, similarly to the seventh modified example described with reference to FIG. 16, the projection optical system 32 (first optical unit L10), the mirror 40, the first diffraction element 50 (second optical unit L20), and the mirror 62 of the light guiding system 60 (third optical unit L30) are arranged between the image light generating device 31 arranged at the side of the head and the second diffraction element 70 (fourth optical unit L40) located in front of the eye E.

In this modified example, the mirror 62 and the second diffraction element 70 are formed at different surfaces of a common member 182. The other configuration is the same as the configuration of the seventh modified example illustrated in FIG. 20. Accordingly, similarly to the seventh modified example illustrated in FIG. 20, wavelength compensation can be properly performed. The mirror 62 and the second diffraction element 70 are formed in the common member 182, and therefore reduction in assembly tolerance can be achieved, for example. The number of types of molds for manufacturing mirrors can be reduced, and therefore reduction in costs can be achieved.

Note that, in this modified example, the prism member 45 may be integrally formed with the member 182. With this configuration, reduction in assembly tolerance can be achieved, for example.

Tenth Modified Example

Figure 24:
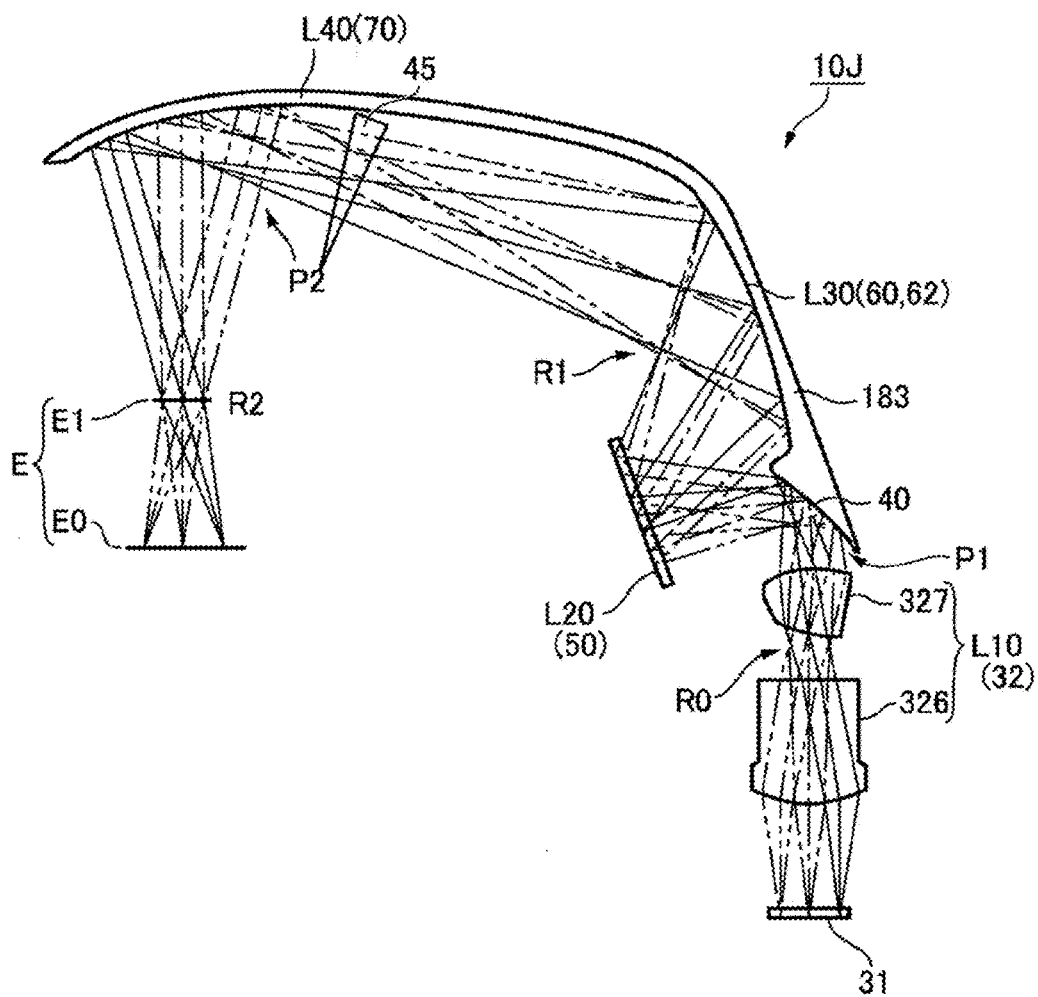
FIG. 24 is an explanatory diagram of a display device according to a tenth modified example.

FIG. 24 is an explanatory diagram of a display apparatus according to a tenth modified example. In an optical system 10J illustrated in FIG. 24, similarly to the seventh modified example described with reference to FIG. 20, the projection optical system 32 (first optical unit L10), the mirror 40, the first diffraction element 50 (second optical unit L20), and the mirror 62 of the light guiding system 60 (third optical unit L30) are arranged between the image light generating device 31 arranged at the side of the head and the second diffraction element 70 (fourth optical unit L40) located in front of the eye E.

In this modified example, the mirror 40, the mirror 62, and the second diffraction element 70 are formed at different surfaces of a common member 183. The other configuration is the same as the configuration of the seventh modified example illustrated in FIG. 20. Accordingly, similarly to the seventh modified example illustrated in FIG. 20, wavelength compensation can be properly performed. The mirror 40, the mirror 62, and the second diffraction element 70 are formed in the common member 183, and therefore reduction in assembly tolerance can be achieved, for example. The number of types of molds for manufacturing mirrors can be reduced, and therefore reduction in costs can be achieved.

Note that, in this modified example, the prism member 45 may be integrally formed with the member 183. With this configuration, reduction in assembly tolerance can be achieved, for example.

Eleventh Modified Example

Next, an optical system according to an eleventh modified example will be described. In an optical system of this modified example, the first diffraction element 50 and the second diffraction element 70 are in a substantially conjugate relationship. In the following, the substantially conjugate relationship between the first diffraction element 50 and the second diffraction element 70 will be described.

Figure 25:
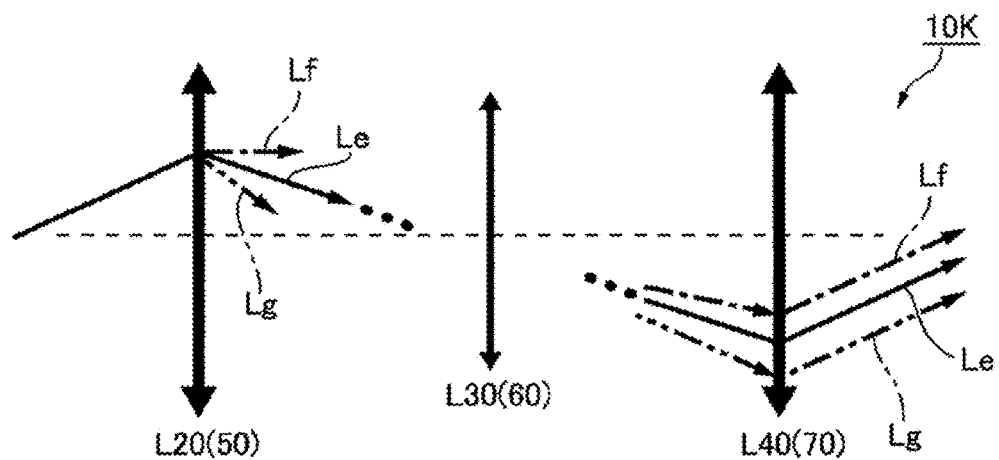
FIG. 25 is an explanatory diagram illustrating a substantially conjugate relationship between a first diffraction element and a second diffraction element according to the tenth modified example.
Figure 26:
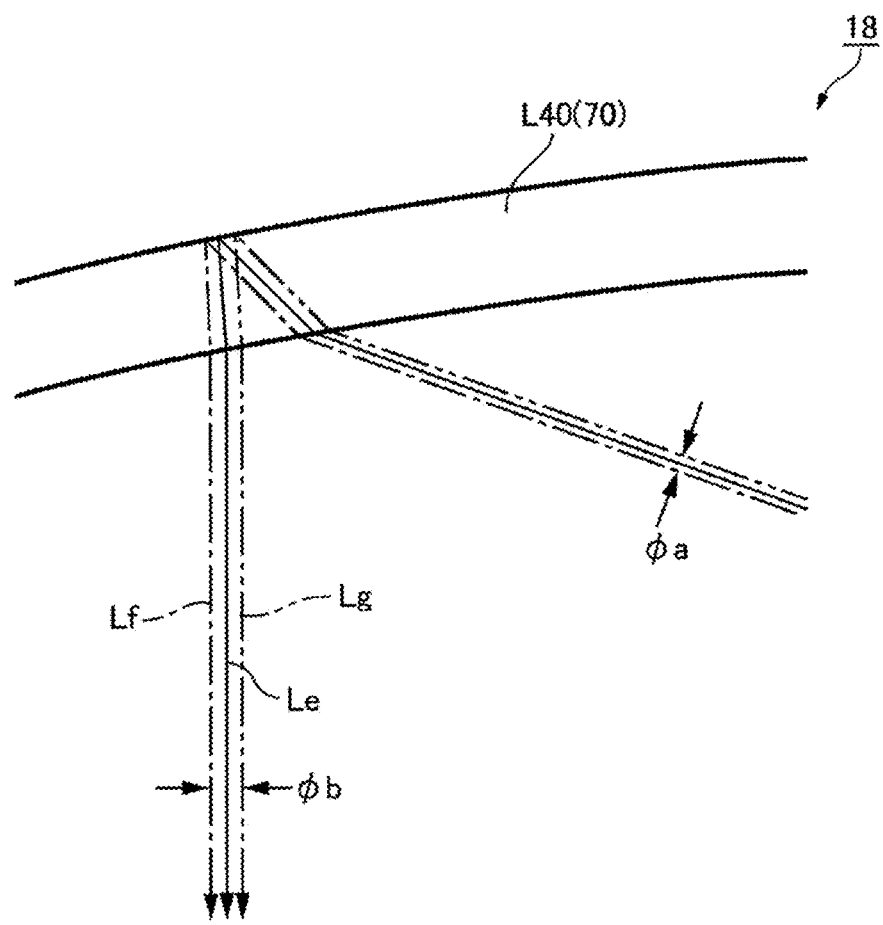
FIG. 26 is an explanatory diagram of light emitted from the second diffraction element when the first and second diffraction elements are in the substantially conjugate relationship.
Figure 27:
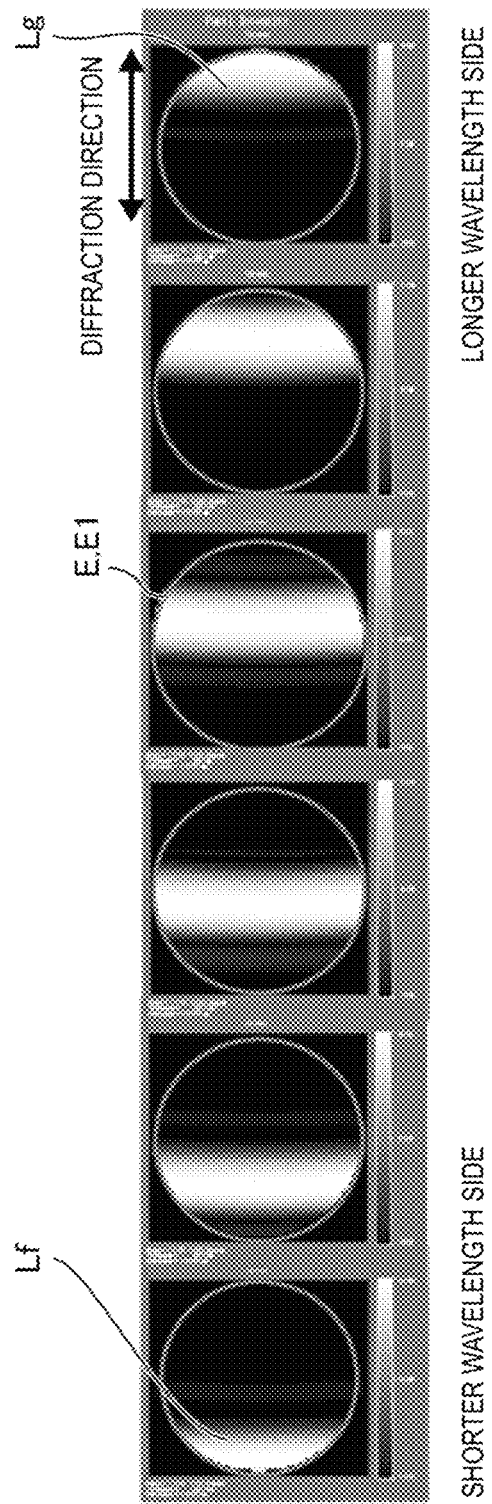
FIG. 27 is an explanatory diagram illustrating a manner in which light is incident on the eye.

FIG. 25 is an explanatory diagram illustrating a substantially conjugate relationship between the first diffraction element 50 and the second diffraction element 70 in an optical system 10K according to this modified example. FIG. 26 is an explanatory diagram of light emitted from the second diffraction element 70, in the substantially conjugate relationship illustrated in FIG. 25. FIG. 27 is a set of explanatory pictures showing states in which the light illustrated in FIG. 26 enters the eye E. Note that, in FIG. 21, a solid line Le represents light in a specific wavelength. A one-dot-one-dash line Lf represents light in a wavelength that is 10 nm shorter than the specific wavelength. A two-dot-one-dash line Lg represents light in a wavelength that is 10 nm longer than the specific wavelength. In FIG. 27, the leftmost picture of the figure shows a state in which the light in a wavelength that is 10 nm shorter than the specific wavelength (the light represented by the one-dot-one-dash line Lf in FIG. 26) enters the eye E. The rightmost picture of the figure shows a state in which the light in a wavelength that is 10 nm longer than the specific wavelength (the light represented by the two-dot-one-dash line Lg in FIG. 26) enters the eye E. Pictures between the leftmost and rightmost pictures show states in which light in various wavelengths, from a wavelength that is 10 nm shorter than the specific wavelength to a wavelength that is 10 nm longer than the specific wavelength, enters the eye E. Note that, in FIG. 27, a state in which light in the specific wavelength enters the eye E is not shown. A state in which light in the specific wavelength enters the eye E shall be a state in between a state shown in the third picture from the left and a state shown in the fourth picture from the left.

In the exemplary embodiments and the modified examples described above, for example, it is preferred that the first diffraction element 50 and the second diffraction element 70 have a conjugate relationship. In this modified example, however, as described above, the first diffraction element 50 and the second diffraction element 70 have a substantially conjugate relationship. In this case, as illustrated in FIG. 25, light in a peripheral wavelength shifted from a specific wavelength enters the second diffraction element 70 in different states. Here, in the second diffraction element 70, as closer to an optical axis, the number of interference patterns is further reduced, and power of bending light is lower. Therefore, when light in a long wavelength side is caused to enter a side close to an optical axis and light in a short wavelength side is caused to enter a side close to an end, light in a specific wavelength and light in a peripheral wavelength are collimated. Consequently, an effect similar to wavelength compensation can be achieved.

In this case, positions of rays of light are different depending on a wavelength. Therefore, as illustrated in FIG. 26, a diameter of rays of light to enter a pupil is increased to a diameter φb from a diameter φa. FIG. 27 shows states of intensity of rays of light entering a pupil in such a case. As can be understood from FIG. 27, a pupil cannot be satisfied near a specific wavelength. However, light in a peripheral wavelength enters a position shifted from the light in the specific wavelength, and thus a pupil diameter can be satisfied. As a result, an observer has an advantage in that the observer can more easily see an image, for example.

Application to Other Display Apparatus

In the exemplary embodiments and the modified examples described above, a head-mounted display apparatus 100 is exemplified. However, the present disclosure may be applied to a head-up display, a hand-held display, and an optical system for a projector, for example.

What is claimed is:

1. A display device comprising:
a first optical unit;
a second optical unit including a first diffraction element;
a third optical unit; and
a fourth optical unit including a second diffraction element;
the first to fourth optical units being provided along an optical path of image light emitted from an image light generating device, wherein
in the optical path,
a first intermediate image of the image light is formed between the first optical unit and the third optical unit,
a pupil is formed between the second optical unit and the fourth optical unit,
a second intermediate image of the image light is formed between the third optical unit and the fourth optical unit,
an exit pupil is formed on a side of the fourth optical unit opposite to the third optical unit,
a prism member configured to correct a ray shape of the image light is provided between the second optical unit and the fourth optical unit,
the first optical unit, the second optical unit, the third optical unit, and the fourth optical unit are disposed along one side of a curve of profile of a user,
when a direction away from the curve of profile of the user on the one side of the curve of profile of the user is defined as an outer side and a direction toward the curve of profile of the user on the one side of the curve of profile of the user is defined as an inner side,
the prism member is directly connected to a light incident surface side of the first diffraction element,
the first optical unit includes a mirror downstream along the optical path from the first intermediate image, and
the prism member is thicker on the inner side than on the outer side.

2. The display device according to claim 1, wherein the first intermediate image is formed in the first optical unit.

3. The display device according to claim 1, wherein the prism member includes a surface having a curvature.

4. A display device comprising:
a first optical unit including a plurality of lenses;
a second optical unit including a first diffraction element;
a third optical unit; and
a fourth optical unit including a second diffraction element;
the first to fourth optical units being provided along an optical path of image light emitted from an image light generating device, wherein
in the optical path, a first intermediate image of the image light is formed between the third optical unit, and a first lens positioned closest to the image light generating device among the plurality of lenses in the first optical unit,
a pupil is formed between the second optical unit and the fourth optical unit,
a second intermediate image of the image light is formed between the third optical unit and the fourth optical unit,
an exit pupil is formed on a side of the fourth optical unit opposite to the third optical unit,
a prism member configured to correct a ray shape of the image light is provided between the second optical unit and the fourth optical unit,
the first optical unit, the second optical unit, the third optical unit, and the fourth optical unit are disposed along one side of a curve of profile of a user,
when a direction away from the curve of profile of the user on the one side of the curve of profile of the user is defined as an outer side and a direction toward the curve of profile of the user on the one side of the curve of profile of the user is defined as an inner side,
the prism member is directly connected to a light incident surface side of the first diffraction element,
the first optical unit includes a mirror downstream along the optical path from the first intermediate image, and
the prism member is thicker on the inner side than on the outer side.

* * * * *